United States Patent
Smith et al.

(10) Patent No.: US 12,462,591 B2
(45) Date of Patent: Nov. 4, 2025

(54) AUTOMATED CELL CULTURE ANALYSIS AND CLASSIFICATION AND DETECTION

(71) Applicant: FUJIFILM Cellular Dynamics, Inc., Valhalla, NY (US)

(72) Inventors: Steven Smith, Fitchburg, WI (US); Takashi Wakui, Kanagawa (JP)

(73) Assignee: FUJIFILM Cellular Dynamics, Inc., Madison, WI (US)

(*) Notice: Subject to any disclaimer, the term of this patent is extended or adjusted under 35 U.S.C. 154(b) by 333 days.

(21) Appl. No.: 18/305,021

(22) Filed: Apr. 21, 2023

(65) Prior Publication Data

US 2023/0343118 A1 Oct. 26, 2023

Related U.S. Application Data

(60) Provisional application No. 63/363,333, filed on Apr. 21, 2022.

(51) Int. Cl.
| | |
|---|---|
| *G06V 20/69* | (2022.01) |
| *G06T 7/00* | (2017.01) |
| *G06T 7/11* | (2017.01) |
| *G06V 10/25* | (2022.01) |
| *G06V 10/44* | (2022.01) |
| *G06V 10/54* | (2022.01) |

(Continued)

(52) U.S. Cl.
CPC .......... *G06V 20/698* (2022.01); *G06T 7/0012* (2013.01); *G06T 7/11* (2017.01); *G06V 10/25* (2022.01); *G06V 10/54* (2022.01); *G06V 10/776* (2022.01); *G06V 10/98* (2022.01); *G06V 20/695* (2022.01); *G06T 2207/30024* (2013.01); *G06T 2207/30108* (2013.01); *G06V 10/44* (2022.01); *G06V 10/56* (2022.01); *G06V 2201/06* (2022.01)

(58) Field of Classification Search
CPC ...... G06V 20/698; G06V 10/25; G06V 10/54; G06V 10/776; G06V 10/98; G06V 20/695; G06V 10/44; G06V 10/56; G06V 2201/06; G06V 10/82; G06T 7/0012; G06T 7/11; G06T 2207/30024; G06T 2207/30108; G06T 2207/10024; G06T 2207/10056; G06T 2207/20081; G06T 2207/20084

See application file for complete search history.

(56) References Cited

U.S. PATENT DOCUMENTS

| | | |
|---|---|---|
| 2011/0233046 A1 | 9/2011 | Nikolenko et al. |
| 2018/0336682 A1 | 11/2018 | Chukka et al. |

(Continued)

FOREIGN PATENT DOCUMENTS

WO 2021035097 A1 2/2021

*Primary Examiner* — Abhishek Sarma
(74) *Attorney, Agent, or Firm* — Heslin Rothenberg Farley & Mesiti P.C.

(57) ABSTRACT

Examples herein include methods, systems, and computer program products for utilizing neural networks in ultrasound systems. The methods include processor(s) of a computing device obtaining an image that depicts cells. The processor(s) applies one or more nuclei detection algorithms to detect nuclear aspects in the image. The processor(s) generates a nuclear segmentation map. The processor(s) utilizes the nuclear segmentation map to identify one or more regions of interest in the image. The processor(s) generates a classification result by automatically determining a cell type for each cell in a region of interest of the regions of interest.

25 Claims, 12 Drawing Sheets

(51) Int. Cl.
*G06V 10/56* (2022.01)
*G06V 10/776* (2022.01)
*G06V 10/98* (2022.01)

(56) References Cited

U.S. PATENT DOCUMENTS

2019/0034564 A1 1/2019 Narcross
2020/0342597 A1 10/2020 Chukka et al.
2021/0117729 A1 4/2021 Bharti et al.
2022/0237930 A1* 7/2022 Rando ................ G06V 10/764

* cited by examiner

AUTOMATED CELL CULTURE ANALYSIS AND CLASSIFICATION AND DETECTION

CROSS-REFERENCE TO RELATED APPLICATIONS

This application claims priority to U.S. Provisional Patent Application No. 63/363,333, which was filed on Apr. 21, 2022, which is incorporated by reference herein in its entirety.

BACKGROUND

Immune function and in particular, tissue resident macrophages play an integral role in disease pathogenesis. Neuro-immune axis and microglia (i.e., the brain resident macrophage), play an essential role in neurodegenerative disease pathobiology including Alzheimer's disease, which is supported by both Genome-wide Association Studies and Omics studies. Tissue resident macrophages play important roles in the pathogenesis of NASH (Kupffer cells), AMD (sub-retinal microglia), asthma, COPD (lung alveolar macrophages), and HIV. Numerous studies have also identified lipid regulatory dysfunction contributing to retinal microglia drusen formation, atherosclerotic plaque formation (peripheral macrophages), pulmonary foam cells, and brain AD neuropathology. Understanding how lipid dysfunction of tissue resident macrophages affects homeostatic function can serve as a therapeutic avenue for a multitude of chronic diseases with an inflammation etiology. To this end, cell cultures comprising induced pluripotent stem cell (iPSC)-derived microglia, astrocytes, and/or neurons in media can be generated and utilized to measure the structure of neurons and inform this avenue. Certain cell cultures, for example, tricultures, can comprise iPSC-derived microglia, astrocytes, and neurons. Because classification of the content of the tricultures, including differentiation of different aspects and determining the statistical information including metrics of the culture enable informed exploration of treatments, quickly and accurately analyzing the cultures is desirable.

SUMMARY

Shortcomings of the prior art are overcome, and additional advantages are provided through the provision of a method for identifying cell structures in images of cell cultures. The method includes, for example: obtaining, by one or more processors of the computing device, an image, wherein the image depicts a cell culture comprising more than one cell type; applying, by the one or more processors, one or more nuclei detection algorithms to detect nuclear aspects in the image; based on detecting the nuclear aspects, generating, by the one or more processors, a nuclear segmentation map; utilizing, by the one or more processors, the nuclear segmentation map to identify one or more regions of interest in the image; and generating a classification result by automatically determining, by the one or more processors, statistical information of the cells.

Shortcomings of the prior art are overcome, and additional advantages are provided through the provision of a computer program product for identifying cell structures in images of cell cultures. The computer program product comprises a storage medium readable by a one or more processors and storing instructions for execution by the one or more processors for performing a method. The method includes, for instance: obtaining, by one or more processors of the computing device, an image, wherein the image depicts a cell culture comprising more than one cell type; applying, by the one or more processors, one or more nuclei detection algorithms to detect nuclear aspects in the image; based on detecting the nuclear aspects, generating, by the one or more processors, a nuclear segmentation map; utilizing, by the one or more processors, the nuclear segmentation map to identify one or more regions of interest in the image; and generating a classification result by automatically determining, by the one or more processors, statistical information of the cells.

Shortcomings of the prior art are overcome, and additional advantages are provided through the provision of a system for identifying cell structures in images of cell cultures. The system comprises a memory; one or more processors in communication with the memory; program instructions executable by the one or more processors to perform a method. The method can include: obtaining, by one or more processors of the computing device, an image, wherein the image depicts a cell culture comprising more than one cell type; applying, by the one or more processors, one or more nuclei detection algorithms to detect nuclear aspects in the image; based on detecting the nuclear aspects, generating, by the one or more processors, a nuclear segmentation map; utilizing, by the one or more processors, the nuclear segmentation map to identify one or more regions of interest in the image; and generating a classification result by automatically determining, by the one or more processors, statistical information of the cells.

Additional features are realized through the devices and techniques described herein. Other embodiments and aspects are described in detail herein and are considered a part of the claimed aspects.

In some examples, program code executing on the aforementioned one or more processors automatically determining the statistical information comprises the program code automatically determining a cell type for each cell in a region of interest of the regions of interest.

In some examples, the statistical information includes an identification of a dominant cell type in the cells.

In some examples, the program code generates, based on determining the cell type for each region of the regions or interest, metrics for the cell culture in the image.

In some examples, the metrics are selected from the group consisting of: a number of cells of each cell type in the image, positional localization of each cell type in the image, cell color for each cell in the image, cell shape of each cell in the image, nuclear shape of each cell in the image, cell boundaries of each cell in the image, and texture metrics.

In some examples, the metrics comprise texture metrics and wherein the texture metrics comprise a plurality of subcellular features.

In some examples, the image comprises a stain image of a cell culture.

In some examples, the cell culture comprises cells selected from the group consisting of: neuronal cells, cardiac cells, embryonic stem cells (ESC), induced pluripotent stem cells (iPSC), neural stem cells (NSC), retinal pigment epithelial stem cells (RPESC), mesenchymal stem cells (MSC), hematopoietic stem cells (HSC), and cancer stem cells (CSC).

In some examples, the cell culture is the neuronal culture and the cells depicted in the image are selected from the group consisting of: neurons, astrocytes, and microglia.

In some examples, the cell culture is the cardiac culture and the cells depicted in the image are selected from the group consisting of: cardiomyocytes and cardiac fibroblasts.

In some examples, the program code automatically determining the cell type for each cell comprises: the program code applying one or more cell classification algorithms to identifications of the regions of interest in the image; the identifications are based on the nuclear segmentation map. The automatically determining can also include the program code determining, based on applying the one or more cell classification algorithms, the cell type for each cell.

In some examples, the cells depicted in the image comprise astrocytes and neurons, and the program code cognitively analyzes the classification result, which includes: the program code detecting connections of each cell in the image with dendrites or with axons, based on identifying connections of a cell classified as an astrocyte in the classification result to a dendrite or an axon, the program code modifying the classification result to classify the cell classified as the astrocyte as a neuron, and based on identifying no connections of a cell classified as a neuron in the classification result to a dendrite or an axon, the program code modifying the classification result to classify the cell classified as the neuron as an astrocyte.

In some examples, the program code detecting the connections of each cell in the image further comprises: the program code obtaining neuron, astrocyte, and microglia channels from the image, the program code applying one or more axon and dendrite detection algorithms to the to the channels from the image, and the program code generating, based on applying the one or more axon and dendrite detection algorithms, a connection map identifying connections of each cell to an axon or to a dendrite.

In some examples, the image comprises a stain image of a cell culture. In some of these examples, the program code obtains culture data for the cell culture. The program code compares the culture data to the classification result.

In some examples, the program code determines, based on the comparing, an inconsistency between the classification result and the culture data. The program code modifies the classification result to correct the inconsistency.

In some examples, the program code determines, based on the comparing, an inconsistency between the classification result and the culture data. The program code updates one or more algorithms applied in the automatically determining the cell type to address the inconsistency.

In some examples, program code executing on one or more processors identifies, based on the statistical information, one or more cells of the cells for either a scale up or a scale out. The program code triggers a manufacturing process, based on the identifying.

In some examples, the image comprises an image of blood or tissue, and the statistical information of the cells comprises a pathology analysis.

In some examples, the detected connections of each cell in the image comprise a neuronal network, and the program code: continuously determines weights of each neuron in the neuronal network, and automatically updates, based on the continuously determining, the weights.

In some examples, the classification result comprises a confidence level quantifying a predicted accuracy of the classification result.

In some examples, the cell culture comprising more than one cell type was generated in a biomanufacturing process and the program code scales the biomanufacturing process based on the confidence level.

In some examples, the statistical information of the cells comprises a binary classification of entities in the cell culture as normal and abnormal.

In some examples, the program code determines that one or more entities are classified as abnormal.

In some examples, the program code alerts a user of the abnormal classifications.

In some examples, the program code determines a probability of a medical condition, based on the classification result.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

DETAILED DESCRIPTION

Figure 1:
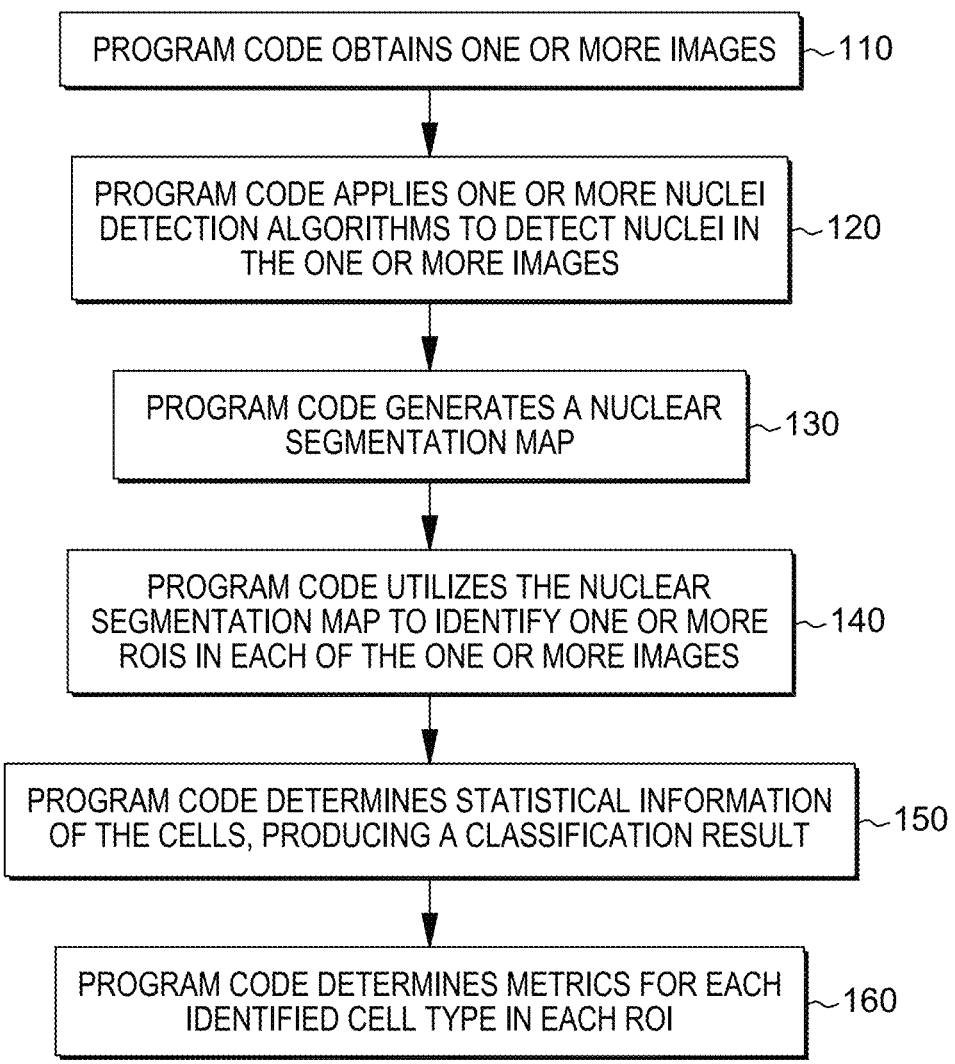
FIG. 1 depicts an example of a workflow for utilizing artificial intelligence to determine the structure of cell culture.

The accompanying figures, which are not drawn to scale for ease of understanding, in which like reference numerals may refer to identical or functionally similar elements throughout the separate views and which are incorporated in and form a part of the specification, further illustrate the present invention and, together with the detailed description of the invention, serve to explain the principles of the present invention. As understood by one of skill in the art, the accompanying figures are provided for ease of understanding and illustrate aspects of certain embodiments of the present invention. The invention is not limited to the embodiments depicted in the figures.

The terms "connect," "connected," "contact" "coupled" and/or the like are broadly defined herein to encompass a variety of divergent arrangements and assembly techniques. These arrangements and techniques include, but are not limited to (1) the direct joining of one component and another component with no intervening components therebetween (e.g., the components are in direct physical contact); and (2) the joining of one component and another component with one or more components therebetween, provided that the one component being "connected to" or "contacting" or "coupled to" the other component is somehow in operative communication (e.g., electrically, fluidly, physically, optically, etc.) with the other component (notwithstanding the presence of one or more additional components therebetween). It is to be understood that some components that are in direct physical contact with one another may or may not be in electrical contact and/or fluid contact with one another. Moreover, two components that are electrically connected, electrically coupled, optically connected, optically coupled, fluidly connected or fluidly coupled may or may not be in direct physical contact, and one or more other components may be positioned therebetween.

The terms "including" and "comprising", as used herein, mean the same thing.

The terms "substantially", "approximately", "about", "relatively," or other such similar terms that may be used throughout this disclosure, including the claims, are used to describe and account for small fluctuations, such as due to variations in processing, from a reference or parameter. Such small fluctuations include a zero fluctuation from the reference or parameter as well. For example, they can refer to less than or equal to ±10%, such as less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%. If used herein, the terms "substantially", "approximately", "about", "relatively," or other such similar terms may also refer to no fluctuations.

As used herein, "electrically coupled" refers to a transfer of electrical energy between any combination of a power source, an electrode, a conductive surface, a droplet, a conductive trace, wire, waveguide, nanostructures, other circuit segment and the like. The terms electrically coupled may be utilized in connection with direct or indirect connections and may pass through various intermediaries, such as a fluid intermediary, an air gap and the like.

As used herein, "neural networks" refer to a biologically inspired programming paradigm which enable a computer to learn from observational data. This learning is referred to as deep learning, which is a set of techniques for learning in neural networks. Neural networks, including modular neural networks, are capable of pattern recognition with speed, accuracy, and efficiency, in situations where data sets are multiple and expansive, including across a distributed network of the technical environment. Modern neural networks are non-linear statistical data modeling tools. They are usually used to model complex relationships between inputs and outputs or to identify patterns in data (i.e., neural networks are non-linear statistical data modeling or decision-making tools). In general, program code utilizing neural networks can model complex relationships between inputs and outputs and identify patterns in data. Because of the speed and efficiency of neural networks, especially when parsing multiple complex data sets, neural networks and deep learning provide solutions to many problems in image recognition, speech recognition, and natural language processing. Neural networks can model complex relationships between inputs and outputs to identify patterns in data, including in images, for classification. Because of the speed and efficiency of neural networks, especially when parsing multiple complex data sets, neural networks and deep learning provide solutions to many problems in image recognition, which are not otherwise possible outside of this technology. As described below, the neural networks in some embodiments of the present invention are utilized to perform image recognition, more specifically, in certain examples herein, to detect and classify cells and/or cellular structures in regions of interest (ROIs) in images of cell cultures, including but not limited to co-cultures.

As used herein, a "convolutional neural network" (CNN) is a class of neural network. CNNs utilizes feed-forward artificial neural networks and are most commonly applied to analyzing visual imagery. CNNs are so named because they utilize convolutional layers that apply a convolution operation (a mathematical operation on two functions to produce a third function that expresses how the shape of one is modified by the other) to the input, passing the result to the next layer. The convolution emulates the response of an individual neuron to visual stimuli. Each convolutional neuron processes data only for its receptive field. It is not practical to utilize general (i.e., fully connected feedforward) neural networks to process images, as very high number of neurons would be necessary, due to the very large input sizes associated with images. Utilizing a CNN addresses this issue as it reduces the number of free parameters, allowing the network to be deeper with fewer parameters, as regardless of image size, the CNN can utilize a consistent number of learnable parameters because CNNs fine-tune large amounts of parameters and massive pre-labeled datasets to support a learning process. CNNs resolve the vanishing or exploding gradients problem in training traditional multi-layer neural networks, with many layers, by using backpropagation. Thus, CNNs can be utilized in large-scale (image) recognition systems, giving state-of-the-art results in segmentation, object detection and object retrieval. CNNs can be of any number of dimensions, but most existing CNNs are two-dimensional and process single images. These images contain pixels in a two-dimensional (2D) space (length, width) that are processed through a set of two-dimensional filters in order to understand what set of pixels best correspond to the final output classification. A three-dimensional CNN (3D-CNN) is an extension of the more traditional two-dimensional CNN and a 3D-CNN is typically used in problems related to video classification. 3D-CNNs accept multiple images, often sequential image frames of a video, and use 3D filters to understand the 3D set of pixels that are presented to it. In the present context, as discussed herein, images provided to a CNN include images of a culture, including but not limited to, stain images of a culture.

As used herein, a "classifier" is comprised of various cognitive algorithms, artificial intelligence (AI) instruction sets, and/or machine learning algorithms. Classifiers can include, but are not limited to, deep learning models (e.g., neural networks having many layers) and random forests models. Classifiers classify items (data, metadata, objects, etc.) into groups, based on relationships between data elements in the metadata from the records. In some embodiments of the present invention, the program code can utilize the frequency of occurrences of features in mutual information to identify and filter out false positives. In general, program code utilizes a classifier to create a boundary between data of a first quality data of a second quality. As a classifier is continuously utilized, its accuracy can increase as testing the classifier tunes its accuracy. When training a classifier, in some examples, program code feeds a pre-existing feature set describing features of metadata and/or data into the one or more cognitive analysis algorithms that are being trained. The program code trains the classifier to classify records based on the presence or absence of a given condition, which is known before the tuning. The presence or absence of the condition is not noted explicitly in the records of the data set. When classifying a source as providing data of a given condition (based on the metadata), utilizing the classifier, the program code can indicate a probability of a given condition with a rating on a scale, for example, between 0 and 1, where 1 would indicate a definitive presence. The classifications need not be binary and can also be values in an established scale. As disclosed herein, a classifier is utilized to classify elements in an image of a cell culture into specific cell types.

As used herein, the term "deep learning model" refers to a type of classifier. A deep learning model can be implemented in various forms such as by a neural network (e.g., a convolutional neural network). In some examples, a deep learning mode includes multiple layers, each layer comprising multiple processing nodes. In some examples, the layers process in sequence, with nodes of layers closer to the model input layer processing before nodes of layers closer to the model output. Thus, layers feeds to the next. Interior nodes are often "hidden" in the sense that their input and output values are not visible outside the model.

As used herein, the term "processor" refers to a hardware and/or software device that can execute computer instructions, including, but not limited to, one or more software processors, hardware processors, field programmable gate arrays (FPGAs), application-specific integrated circuits (ASICs), and/or programmable logic devices (PLDs).

As used herein, the term "astrocyte" refers to a sub-type of glial cells in the central nervous system (CNS) which are also referred to as astrocytic glial cells. Astrocytes are generally star-shaped; their many processes typically envelope synapses made by neurons in vivo. Three forms of astrocytes exist in the CNS, fibrous, protoplasmic, and radial. The fibrous glia are usually located within white matter, have relatively few organelles, and exhibit long unbranched cellular processes. This type often has "vascular feet" that physically connect the cells to the outside of capillary walls when they are in close proximity to them. The protoplasmic glia are found in grey matter tissue, possess a larger quantity of organelles, and exhibit short and highly branched tertiary processes. The radial glia are disposed in a plane perpendicular to the axis of ventricles. Radial glia are predominantly present during development and can play a role in neuron migration in vivo. Mueller cells of retina and Bergmann glia cells of cerebellar cortex represent an exception and are still present during adulthood.

As used herein the term "cardiomyocyte" (also referred to as a myocardiocyte), is a type of cell that comprises a heart or cardiac muscle. It is considered a chief cell type in the heart and its primary function is contracting the heart to enables the pumping of blood around the body.

As used herein the term "cardiac fibroblast" refers to a cell that forms one of the largest populations in a heart. This cell contributes to structural, biochemical, mechanical and electrical properties of the myocardium (i.e., the muscle layer of the heart).

As used herein the term "co-culture" refers to a cellular culture or sample that includes more than one cell type or type of cell.

As used herein, the terms "scale-up" and "scale-out" refer to strategies in biotechnological and bioprocessing industries, and specifically, manufacturing within these industries. Scaling-up and scaling-out are strategies employed to generate large numbers of cells. Scale-up systems progressively increase a surface area/culture volume as the cell number raises. Scale-out systems are based on the use of multiple culture vessels/bioreactors working in parallel. As will be discussed herein, aspects of the techniques disclosed provide speed, reproducibility, and accuracy in conjunction with non-invasive, automated methods for aiding in scaling the biomanufacturing process as cell therapies translate from the laboratory to the clinic.

Embodiments of the present invention include a computer-implemented method, a computer program product, and a computer system where program code executing on one or more processors automatically determines aspects of a structure based on machine-learning various aspects that enable the program code to identify the aspects of the structure and thus, identify the structure. Machine learning in certain embodiments of the present invention is accomplished by applying a machine learning model. Machine learning models utilized in the examples herein include, but are not limited to, random forests models, including deep random forests, neural networks, including recurrent neural networks and convolutional neural networks, restricted Boltzmann machines, recurrent tensor networks, and gradient boosted trees. In the computer-implemented methods, computer program products, and computer systems described herein, program code executing on one or more processors provides statistical information of a target culture, including but not limited to what kind of cell type is dominant in a given culture. In each of these examples, the cell cultures comprise more than one type of cell and thus are co-cultures, tri-cultures, etc. In some examples, the program code can utilize this statistical information to calculate cell types in the target culture from the statistical information A non-limiting example herein utilized to illustrate aspects of the processes discussed herein is program code executing on one or more processors automatically determining aspects of the structure of a neuron in a cell culture. Certain non-limiting examples are provided herein for illustrative purposes, only, but aspects of the processes described herein can be utilized for various purposes and across various industries, including being integrated into manufacturing methods that use one or more algorithms described herein to identify cells for scale up/scale out manufacturing processes. Aspects described herein can be utilized for identifying aspects of co-cultures such as cardia cells, including but not limited to, bi-cultures, tri-cultures, etc. Aspects of the examples herein can also be applied to different types of cells, including but not limited to human cells and/or diseased cell. Samples utilized herein can be a human sample, including blood. For example, a pathology sample can be utilized by the program code for disease detection and training of the algorithms described herein. Additionally, aspects of the examples herein can be utilized to identify and/or detect the cell qualities, including but not limited to: type, characteristics, health (including whether the cell is diseased or healthy). Despite the breadth of applicability of the examples herein, to illustrate the utility of these examples, certain examples are described herein in detail.

Embodiments of the present invention include a computer-implemented method, a computer program product, and a computer system where program code executing on one or more processors automatically determines aspects of the structure of cell in a culture. As discussed herein, in each example, images of cell cultures provided to program code are at least co-cultures (in that they comprise more than one cell type). The images of the sample can include, but are not limited to, embryonic stem cells (ESC), induced pluripotent stem cells (iPSC), neural stem cells (NSC), retinal pigment epithelial stem cells (RPESC), mesenchymal stem cells (MSC), hematopoietic stem cells (HSC), and cancer stem cells (CSC). Thus, aspects of the computer-implemented methods, computer program products, and computer systems described herein can be applied to wide type of cells that include neuronal cells. The application of these computer-implemented methods, computer program products, and computer systems are described herein as related to neuronal cells, specifically, as a non-limiting illustrative example. Specifically, in the examples herein, program code executing on one or more processors automatically determines aspects of the structure of a neuron in a cell culture. In various embodiments of the present invention, the program code cognitively analyzes and provides determinations and/or classifications, for various elements of a cell culture, including but not limited to, a co-culture (i.e., a cell cultivation set-up, in which two or more different populations of cells are grown with some degree of contact between them) and/or a tri-culture (i.e., a co-culture with three distinct types of cell). In the examples herein, the cultures analyzed by the program code include cells of at least three different types: 1) neurons (i.e., information messengers that use electrical impulses and chemical signals to transmit information between different areas of the brain, and between the brain and a remainder of the nervous system); 2) astrocytes (i.e., glial cells in the brain and spinal cord that perform functions, including but not limited to, biochemical support of endothelial cells that form the blood-brain barrier, provision of nutrients to the nervous tissue, maintenance of extracellular ion balance, regulation of cerebral blood flow, and repairing and scarring the brain and spinal cord following infection and traumatic injuries); and/or 3) microglia (i.e., cells in the central nervous system (CNS) understood as immune sentinels capable of orchestrating a potent inflammatory response). The types of neurons can vary and can include, but are not limited to, GABAergic neurons (GABA), which produce gamma-Aminobutyric acid, an inhibitory transmitter in the CNS, glutamatergic neurons (gluta), which produce glutamate, a common excitatory neurotransmitters in the CNS, and/or motor neurons, which control a variety of downstream targets. The program code in some examples herein can identify the types of cells in the culture, in real-time or near real-time, and can provide metrics describing the cells, including but not limited to, a number of cells of each cell type, positional localization of each cell type, cell color, cell shape (e.g., size, roundness, etc.), nuclear shape (e.g., size, roundness, etc.), cell boundaries, and/or a plurality of texture metrics. The texture metrics can include a plurality of subcellular features.

Described herein are a computer-implemented method, a computer program product, and a computer system where program code executed by one or more processors determines the cellular contents of a cell culture such as, without limiting, neurons, astrocytes, and/or microglia. Based on obtaining a stain image of a culture, the program code can detect nuclei, determine regions of interest (ROIs) based on this detection, and classify the cells by type in each ROI of the stain image, and determine metrics and statistical information for the culture which can also be understood as metrics which describe aspects of the more the one type of cells in each image of a culture provide to the program code (e.g., types of cells in the culture, in real-time or near real-time, and can provide metrics describing the cells, including but not limited to, a number of cells of each cell type, positional localization of each cell type, cell color, cell shape (e.g., size, roundness, etc.), and/or nuclear shape (e.g., size, roundness, etc.). In some examples, the program code detects connections between cells and based on these connections, further differentiates axons (i.e., a part of a given neuron from which electrical impulses travel to be received by other neurons) and dendrites (i.e., a part of a given neuron which receives input from other cells) to differentiate between astrocytes and neurons in the image. The former does not comprise dendrites and axons while the latter does. The program code can check (and possibly modify) results and train artificial intelligence (AI) and/or machine-learning algorithms providing nuclei detection, classification of cells, and/or identification of axons and dendrites, by comparing results generated by applying one or more of these detectors/classifiers to culture information. Thus, in embodiments of the present invention, the program code continually improves the AI and/or machine-leaning algorithms based on feedback, including but not limited to tuning the AI and/or machine-leaning algorithms by automatically updating weights of each neuron in a neuronal network so as to improve the accuracy of results generated by the program code.

In some embodiments of the present invention, program code generates a classification result. In some examples, the program code executing on one or more processors obtains an image depicting cells. The program code applied one or more nuclei detection algorithms to detect nuclear aspects in the image. The program code, having detected these aspects, generates a nuclear segmentation map. The program code utilizes the nuclear segmentation map to identify one or more regions of interest in the image. The program code generating the aforementioned classification result by automatically determining statistical information of the cells. This statistical information can include a cell type for each cell in a region of interest of the regions of interest. The statistical information can also include an identification of a dominant cell type in the cells.

Embodiments of the present invention are inextricably tied to computing, provide significantly more than existing approaches to cell identification in images of cultures, and are directed to a practical purpose. Embodiments of the present invention are inextricably tied to computing at least because certain of the examples described herein include machines learning and, in particular, training one or more classifiers, to determine, in real-time, without human intervention or other time-consuming methods, the types of cells in images of cultures. Embodiments of the present invention are inextricably tied to computing at least because aspects of the examples herein relate to the field of artificial intelligence (AI) as utilized in classifiers and specifically enabling transparency in decision-making (e.g., classification) by AI based on cognitively analyzing data. In addition to identifying the cell types, which is accomplished by the aforementioned classifiers, the program code, based on applying trained models produced by machine learning algorithms, provides metrics related to the identified entities, enabling users to make treatment decisions in a timely manner and without performing an intensive, time-consuming, analysis of the cultures. Thus, the program code can train (and progressively re-train) one or more classifiers to identify and analyze the constituents of cell cultures, by utilizing automated image analysis algorithms. As aforementioned, at least because the techniques described herein are faster (the program code can provide determinations in real-time or near real-time) and cell identification in a culture can otherwise be a lengthy and manual process, the examples herein provide a significant improvement over existing approaches. For example, astrocytes, which are identified by the program code in certain examples herein, are classically identified using histological analysis, e.g., a microscopic examination of tissue (e.g., a biopsy or surgical specimen. The examples are directed to a practical purpose because automatically identifying and determining various aspects of cells within an image of a culture can provide a therapeutic avenue for a multitude of chronic diseases with an inflammation etiology, including but not limited to, detecting a probability of a condition for assistance in a diagnosis by a medical professional. These examples can be utilized in various practical purposes, including but not limited to, screening a therapeutic compound for treating a neurodegenerative disease, screening for a neurodegenerative disease, differentiating induced pluripotent stem cells, screening a test compound, identifying cells for scale up/scale out for manufacturing, performing a pathology analysis of blood and/or tissue, and/or providing insight into a culture being utilized to mimic human brain development. Certain of these practical purposes are at least partially enabled based on cognitively analyzing a sample utilizing a trained algorithm. Regarding manufacturing, aspects discussed herein aid in manufacturing, for example, by allowing manufacturers to derive cell image feature confidence intervals for cell therapeutics' release criteria.

Figure 6:
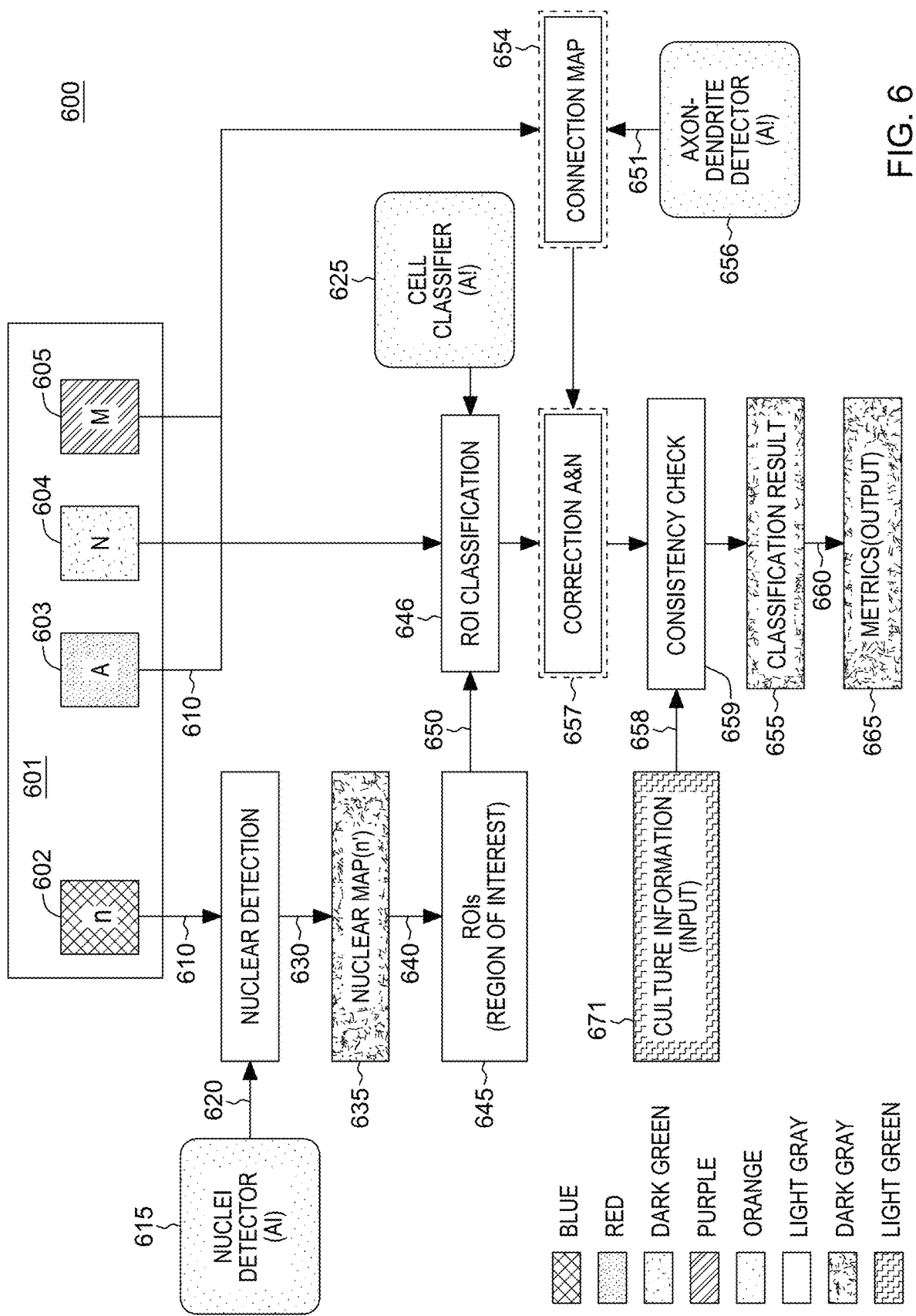
FIG. 6 depicts an example of aspects of a technical environment and a workflow performed by those aspects in utilizing artificial intelligence to determine the structure of neuron culture.
Figure 7:
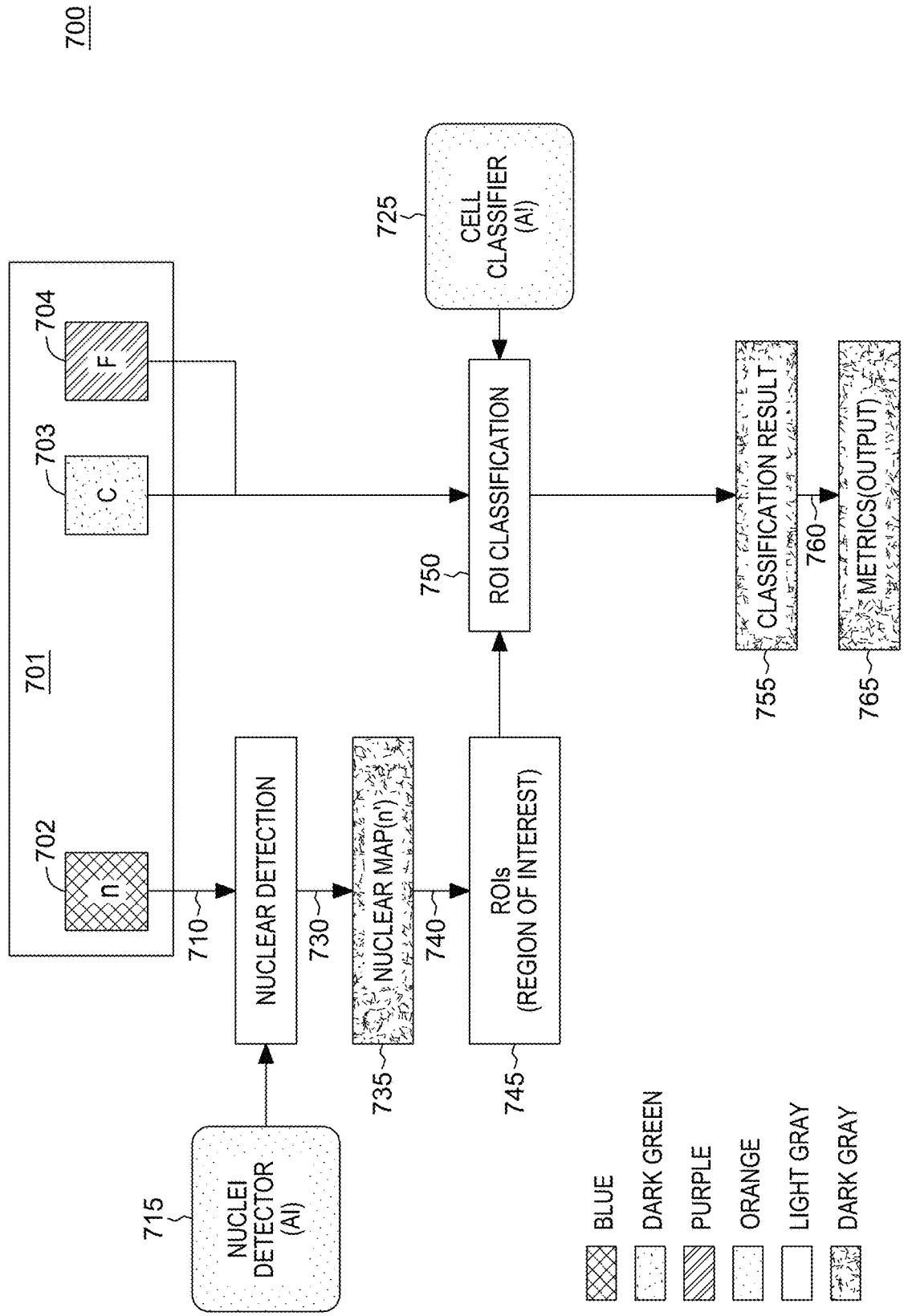
FIG. 7 depicts an example of aspects of a technical environment and a workflow performed by those aspects in utilizing artificial intelligence to determine the structure of one or more cardiac cells.
Figure 8:
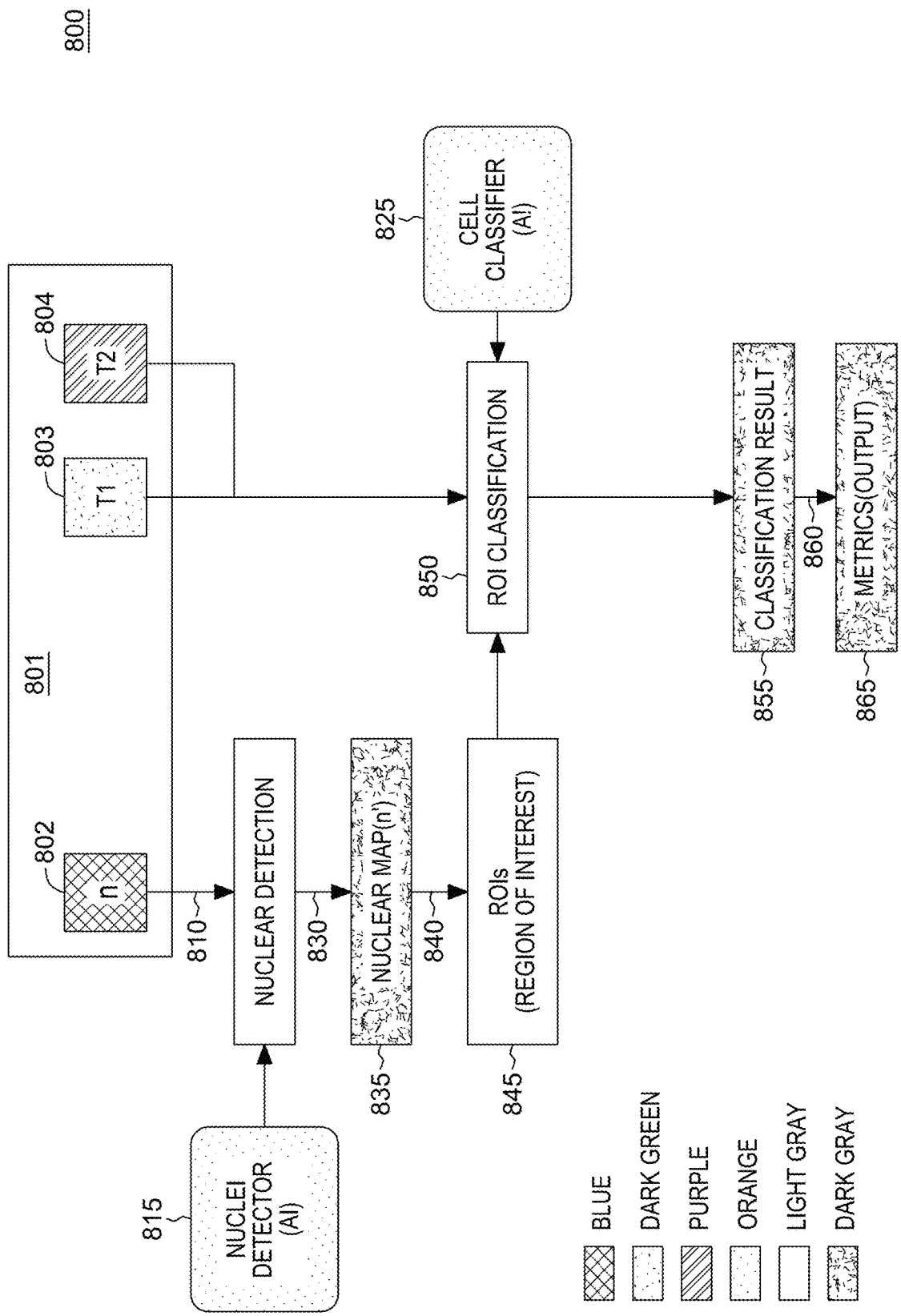
FIG. 8 depicts an example of aspects of a technical environment and a workflow performed by those aspects in utilizing artificial intelligence to determine the structure of a sample comprising one or more cells.

The figures discussed herein provide various examples of aspects described herein. In order to illustrate the functionality of certain aspects with respect to certain types of cells, some of the figures include non-limiting examples. Others of the figures are more general. The specificity of various figures is not meant to suggest any limitations but rather to provide illustrative examples that demonstrate the overall functionality of various aspects disclosed herein. To that end, FIG. 1 illustrates a general workflow that is applicable across different cultures as well as different types of collections of samples of cellular structures. Throughout the discussion of FIG. 1, reference is made to neuronal as well as cardiac cells to illustrate these non-limiting applications. FIGS. 2-6, meanwhile, include and/or discuss examples related to applying aspects herein to detect neuronal cells. Meanwhile, FIG. 7 illustrates applications of various aspects herein to cardiac cells. Upon providing some specific example, FIG. 8 provides a more general illustration of some aspects of some aspects described herein without using a specific example to illustrate these aspects. Thus, FIG. 8 illustrates a general application of certain aspects to a structure or sample comprising cells, including but not limited to cell cultures, including cultures, bi-cultures and/or tricultures, biopsy, blood specimens, etc.

FIG. 1 is a workflow 100 that illustrates various aspects of some embodiments of the present invention. Certain of these aspects are expanded upon in later discussion, but FIG. 1 provides a framework for reference in some examples. As illustrated in FIG. 1, in some examples, of the method, computer program product includes program code executing on one or more processors that determines and measures a structure of one or more culture, including but not limited to a neuron co-culture and/or tri-culture. The example illustrated in FIG. 1 includes some aspects that are specific to a neuron culture for illustrative purposes only. As understood by one of skill in the art, the examples described herein, including the aspects of FIG. 1, can also be applied to different types of cell cultures. For example, the culture can be a cardiac culture.

Returning to FIG. 1, in this illustrated and non-limiting example, the program code obtains one or more images (110). In some examples, the one or more images comprise images of cultures (such as for e.g., neuron co-cultures and/or tri-cultures). These images can be stained images, including but not limited to fluorescent-stained images. In some examples, the images comprise input data for nuclear and each cell type (or channel): a nuclear channel, a neuron channel, an astrocyte channel, and a microglia channel. However, as received, these different elements are not yet identified or differentiated by the program code. In various illustrations herein, these entities are illustrated as separate for ease of understanding. However, the program code differentiates the cell types by applying one or more artificial intelligence (AI) instruction sets, which can also be understood as trained classification algorithms.

Figure 2:
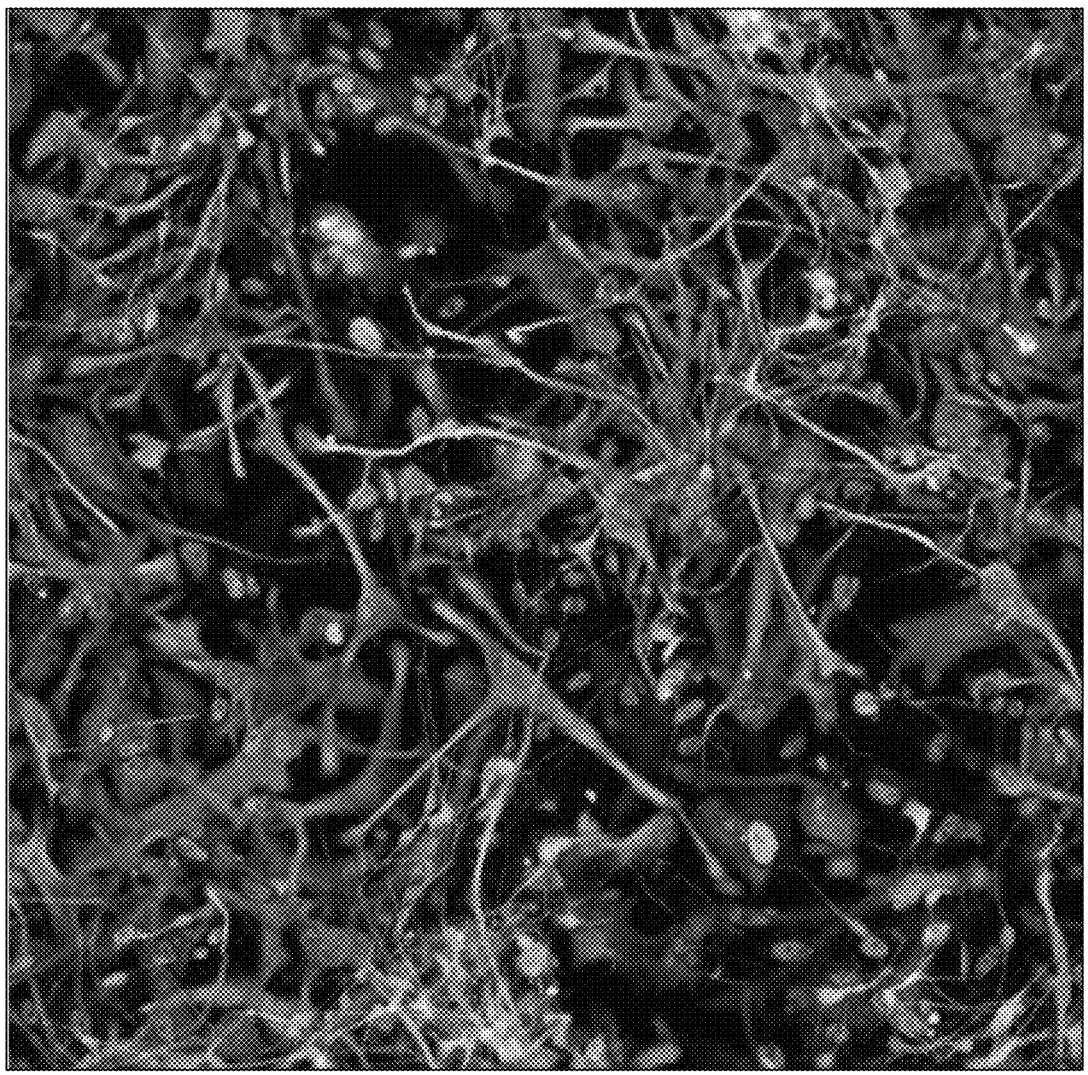
FIG. 2 depicts an example of input data received by the program code in various examples disclosed herein.

FIG. 2 is an example of an image 200 of the one or more images that the program code obtains as input data (110). Specifically, FIG. 2 is an examples of a tri-culture image 200. The image can include, and in the example of FIG. 2 does include, neurons, depicted in green, astrocytes, depicted in red, and microglia, depicted in violet. The image 200 can be a phase contrast image of a three-dimensional (3D) triculture with cryopreserved iPSC-derived Gluta neurons, astrocytes and microglia with the cell ratios of all three cell types. The culture from which the image 200 is produced, which can include neuronal cell types that are derived from pluripotent cells, including iPS cells, are commercially available and can be purchased. For example, iCell® Neurons, iCell® DopaNeurons, and iCell® Astrocytes are derived from human iPS cells and may be purchased from Cellular Dynamics International (Madison, Wisconsin). iCell® Neurons are human induced pluripotent stem cell (iPSC)-derived neurons that exhibit biochemical, electrophysiological, and pathophysiological properties characteristic of native human neurons. Due to their high purity, functional relevance, and ease of use, iCell® Neurons represent a very useful in vitro test system for neurobiology interrogations in basic research and many areas of drug development.

Returning to FIG. 1, the program code applies one or more nuclei detection algorithms to detect nuclei in the one or more images (120). In some examples, the nuclei detection can comprise classifiers, including image classifiers, such as Artificial Neural Networks (ANN), the aforementioned CNNs (including, but not limited to Mask-RCNNs), Autoencoder Neural Networks (AE), Deep Convolutional Networks (DCN), and/or other image classifiers and/or segmentation models that are known by a person of ordinary skill in the art, and combinations thereof. In examples that utilize a CNN, the program code can configure the CNN utilizing an artificial intelligence (AI) instruction set (e.g., native AI instruction set or appropriate AI instruction set). In certain examples herein, the classifiers utilized are deep learning models. The nodes and connections of a deep learning model can be trained and retrained without redesigning their number, arrangement, interface with image inputs, etc. In some examples, these node collectively form a neural network. However, in certain embodiments, the nodes of the classier do not have a layered structured. To configure the neural network, the program code can connect layers of the network, define skip connections for the network layers, set coefficients (e.g., convolutional coefficients) to trained values, set a filter length, and determine a patch size (e.g., a n×n pixel area of the image, where n can be 3, 4, etc.). In some examples, the program code utilizes a neural network to detect the nuclei in the one or more images, in real-time. In some examples, program code comprising a nuclei detector is a pre-trained CNN configured to classify aspects of the images obtained by the program code. In some examples, the CNN can be MobileNet or MobileNet2 and available in libraries such as without limiting Keras, TensorFlow, and other libraries known by a person of ordinary skill in the art. The nuclei detector can be generated, by the program code in embodiments of the present invention, can be generated from a pre-trained CNN deleting, modifying, or replacing at least a layer of neurons (e.g., input layer, output layer).

Based on detecting nuclei in the one or more images, the program code generates a nuclear segmentation map (e.g., nuclear map (n'), where n' is the nuclear channel, as originally received within the image data) (130). In some embodiments of the present invention, the program code performs nuclear detection in the image by providing the image to a deep CNN, which applies a classification model to the image to classify the image to generate the nuclear segmentation map. The program code can supply or feed the one or more images into either a pre-trained or a vanilla 3D-CNN. The term "trained" refers to whether the model (e.g., classification algorithms, filters) utilized by the CNN were tuned utilizing training data. In some examples, the program code combines image processing features with a data-driven deep learning model, to produce the segmentation map. In some embodiments of the present invention, the program code provides each of the one or more images, which include nuclear channels, to a nuclei detection AI. The AI generates a nuclear segmentation map as its output.

The program code utilizes the nuclear segmentation map to identify one or more ROIs in each of the one or more images (140). The ROIs include the segmented nuclear channel and astrocytes, microglia, and neurons (portions of the astrocytes, microglia, and neuron channels in the initially obtained one or more images) (e.g., n'/A/N/M). The program code determines statistical information of the cells, producing a classification result (150). In some examples, the program code can determine the cell type of each ROI. In some examples, the program code determines the cell type of each ROI by applying a cell classifier. The program code of the cell classifier obtains the ROIs (as input) and outputs the cell type of each ROI. The cell classifier can be implemented utilizing a similar approach to the nuclei detector. For example, the cell classifier can comprise an AI instruction set. The cell classifier can also utilize a neural network, including but not limited to, a CNN, in the same manner as the nuclei detector. For example, the cell classifier can comprise an image classifier, such as an Artificial Neural Network (ANN), an aforementioned CNN, an Autoencoder Neural Network (AE), a Deep Convolutional Network (DCN), and/or other image classifiers that are known by a person of ordinary skill in the art, and combinations thereof. The classifier can comprise machine learning algorithms. In some examples herein, various existing machine learning algorithms can be utilized in the cell classifier to perform cognitive analyses of the ROIs. These existing machine learning algorithms can include, but are not limited to, a Naïve Bayes Classifier Algorithm, a K Means Clustering Algorithm, a Support Vector Machine Algorithm, an Apriori Algorithm, Linear Regression, Logistic Regression, an Artificial Neural Networks, Random Forests, Decision Trees, and Nearest Neighbours.

In some examples, the program code tunes the classifier to increase its accuracy. In an embodiment of the present invention, the program code feeds images with previously identified cell types into the cell classifier and utilizes the cell classifier to classify the images by identifying the cell types in the images. As the training data includes images with elements with known classifications, the machine learning algorithm can learn from the training data that the accuracy of the classifier can be tested and the tuned, based on this feedback. One non-limiting example of the tuning is that the program code automatically updates weights of each neuron in a neuronal network so as to get better results with this feedback. Thus, as explained herein, a continuous feedback loop in certain examples herein can continually tune and refine the classifier.

Based on the classification result, the program code determines metrics for each identified cell type in the ROIs (160). These metrics can include, but are not limited to, a number of cells of each cell type, positional localization of each cell type, and/or for each cell type: cell color, cell shape (e.g., size, roundness, etc.), statistical features among identified cells, and/or nuclear shape (e.g., size, roundness, etc.). In some examples, the program code determines which type of cell is dominant in a given culture. As discussed above, these metrics, produced by the program code, can be utilized for various applications, including but not limited to, determining disease progression, determining treatment efficacy, recommending a treatment, etc. In some embodiments of the present invention, the program code can provide the metrics to an electronic medical records system, for example, by generating an HL7 message. Based on the program code producing the metrics, the cell cultures themselves can be utilized in the discovery, development and testing of new drugs and compounds that interact with and affect the biology of neural stem cells, neural progenitors or differentiated neural or neuronal cell types. The neural cells can also have great utility in studies designed to identify the cellular and molecular basis of neural development and dysfunction including but not limited to axon guidance, neurodegenerative diseases, neuronal plasticity and learning and memory. Such neurobiology studies may be used to identify novel molecular components of these processes and provide novel uses for existing drugs and compounds, as well as identify new drug targets or drug candidates.

As discussed above, because FIG. 1 illustrates aspects most relevant to applying the program code to a neuronal culture, the cells include neurons, astrocytes, and microglia. As mentioned above, the aspects described herein can also be applied to different types of cell cultures, including but not limited to, cardiac culture. In cardiac cultures, the differentiates cells can include cardiomyocytes and cardiac fibroblasts.

Figure 3:
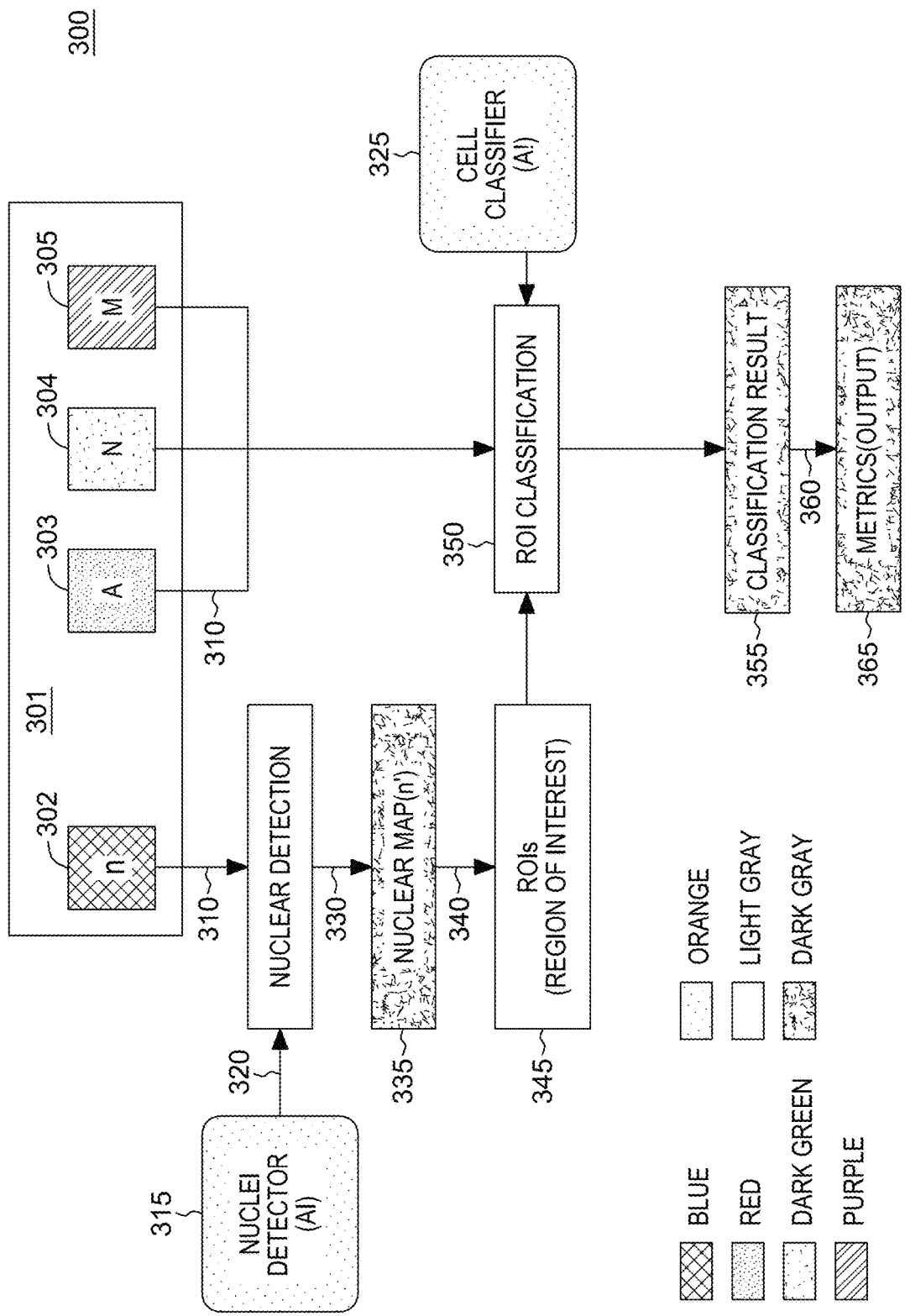
FIG. 3 depicts an example of aspects of a technical environment and a workflow performed by those aspects in utilizing artificial intelligence to determine the structure of neuron culture.
Figure 4:
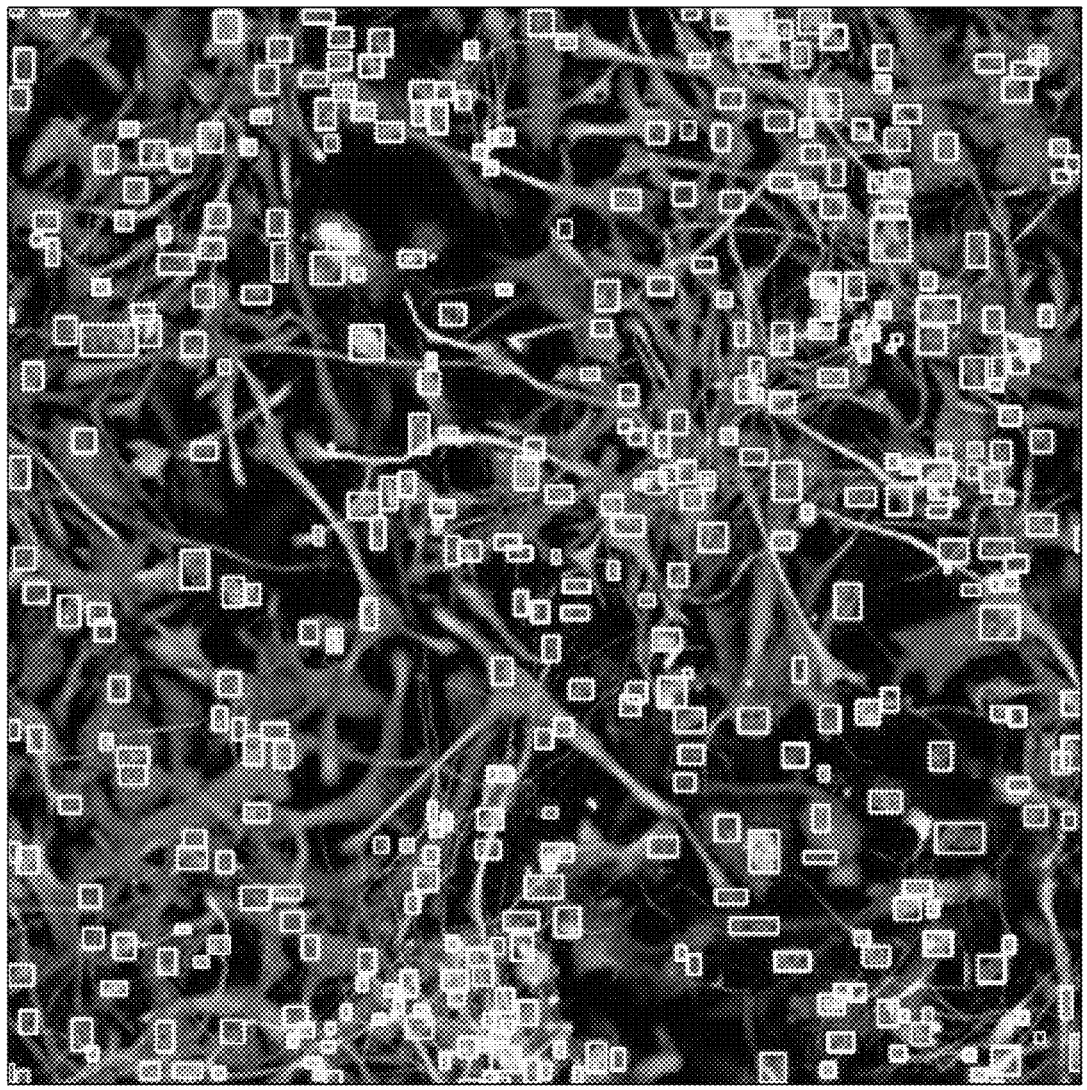
FIG. 4 depicts an example of a results that can be generated by certain examples disclosed herein.

FIG. 3 provides an illustration 300 of various aspects of the workflow 100 of FIG. 1. FIG. 3 provides a more graphical view of various aspects also described in FIG. 1. FIG. 3 is provided for illustrative purposes and for ease of understanding, aspects of the workflow 100 of FIG. 1 integrated into FIG. 3 are labeled similarly as in FIG. 1. However, FIG. 3 may include different aspects and examples than FIG. 1 and these differences do not introduce any limitations and merely illustrate different examples of those various aspects across various implementations. As illustrated in FIG. 3, program code executing on one or more processors obtains image data 301 (310). The image data 301 can be fluorescent images of cell cultures, including cultures, bi-cultures and/or tricultures, biopsy, blood specimens etc. In this example, the image data includes multiple staining with stains corresponding to nuclear 302 and each cell type: neurons 304, astrocytes 303, and microglia 305. The program code applies a nuclei detection AI 315 (e.g., one or more trained machine learning algorithm which can be applied via a neural network) to detect nuclei in the one or more images 301, which includes the nuclear channel 302 (320). Based on detecting nuclei in the one or more images 301, the program code generates a nuclear segmentation map (e.g., nuclear map (n')) 335 (330). The program code utilizes the nuclear segmentation map to identify one or more ROIs 345 in each of the one or more images (340). The ROIs 345 include the segmented nuclear channel 302, astrocytes 303, microglia 304, and neurons 305. The program code generates a classification result 355 by automatically determining, by the one or more processors, statistical information of the cells (350). In some examples, the program code determines the cell type of each ROI by applying a cell classifier AI 325, producing a classification result 355. In some examples, the program code, utilizing the statistical information, identifies a dominant cell type in the cells. Based on the classification result, the program code determines metrics 365 for each identified cell type in the ROIs (360). These metrics can include, but are not limited to, a number of cells of each cell type, positional localization of each cell type, and/or for each cell type: cell color, cell shape (e.g., size, roundness, etc.), and/or nuclear shape (e.g., size, roundness, etc.). In some examples herein, the program code can modify the initial image or images 301 provided to the program code, including marking the identified cell types and nuclear aspects of the images 301. FIG. 4 is an example of an image 400 that has been marked up by the program code. The box elements indicate ROIs. The color of each ROI indicated the cell type. The same coloration scheme is used as in FIG. 2: neurons are depicted in green; astrocytes are depicted in red, and microglia are depicted in violet. The blue is the nuclear channel.

Figure 5:
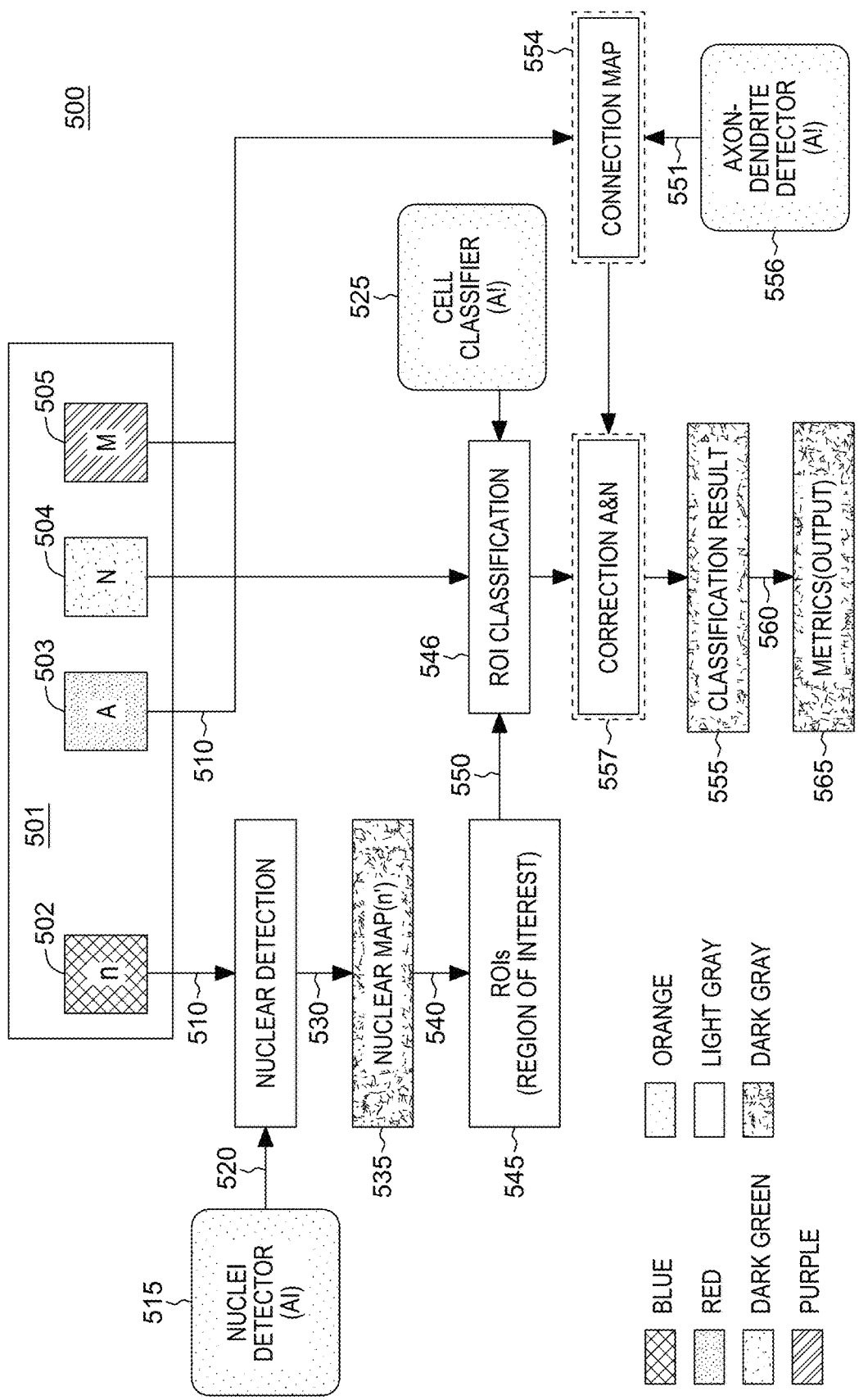
FIG. 5 depicts an example of aspects of a technical environment and a workflow performed by those aspects in utilizing artificial intelligence to determine the structure of neuron culture.

FIG. 5 is an illustration 500 of aspects of some examples disclosed herein and like FIG. 3, it includes a workflow similar to the workflow 100 of FIG. 1. However, FIG. 5 implements an additional intelligence check in its structural identification processes. Because astrocytes 503 and neurons 504 sometimes have similar appearances, the program code in this example, also determines cell connectivity with dendrite or axons by detecting this connectivity in each channel (e.g., nuclear 502, neuron 504, astrocyte 503, and microglia 505). Neurons comprise dendrite or axons while astrocytes do not, thus, the program can determine if an astrocyte was erroneously identified to be a neuron and vice versa. As aforementioned, the example herein is applicable to different types of cells and FIG. 5 is a non-limiting example that demonstrates the application of aspects herein to neuronal cells.

As illustrated in FIG. 5, program code executing on one or more processors obtains image data 501 (510). The image data 501 can be fluorescent images of cell cultures, including bi-cultures and/or tricultures. In this example, the image data includes multiple staining with stains corresponding to nuclear 502 and each cell type: neurons 504, astrocytes 503, and microglia 505. The program code applies a nuclei detection AI 515 (e.g., one or more trained machine learning algorithm which can be applied via a neural network) to detect nuclei in the one or more images 501, which includes the nuclear channel 502 (520). Based on detecting nuclei in the one or more images 501, the program code generates a nuclear segmentation map (e.g., nuclear map (n')) 535 (530). The program code utilizes the nuclear segmentation map to identify one or more ROIs 545 in each of the one or more images (540). The ROIs 545 include the segmented nuclear channel 502, astrocytes 503, microglia 504, and neurons 505. The program code determines the cell type of each ROI by applying a cell classifier AI 525 to produce ROI classifications 546 (550).

Concurrently and/or asynchronously to detecting the nuclei (520) and classifying the cells in each ROI (550), the program code detects dendrites and/or axons in cell type channels of the one or more images 501 (neuron 504, astrocyte 503, and/or microglia 505) and generates a segmentation or connection map 554 (551). To generate the connection map 554, the program code applies an axon and dendrite detector 556, which can be understood as an AI or machine-learning process, to the neuron 504, astrocyte 503, and/or microglia 505 channels. The segmentation or connection map 554 includes a segmented representation of axons or dendrites, cell bodies, and/or background.

The axon and dendrite detector 556 can be implemented utilizing a similar approach to the nuclei detector 515. For example, the axon and dendrite detector can comprise an AI instruction set. The axon and dendrite detector can also utilize a neural network, including but not limited to, a CNN, in the same manner as the nuclei detector. For example, the axon and dendrite detector can comprise an image classifier, such as an Artificial Neural Networks (ANN), an aforementioned CNN, Autoencoder Neural Networks (AE), Deep Convolutional Networks (DCN), and/or other image classifiers that are known by a person of ordinary skill in the art, and combinations thereof. The classifier, classifying elements as dendrites or axons, can comprise machine learning algorithms. In some examples herein, various existing machine learning algorithms can be utilized in the axon and dendrite detector to perform cognitive analyses of the channels from the one or more images 501. These existing machine learning algorithms can include, but are not limited to, a Naïve Bayes Classifier Algorithm, a K Means Clustering Algorithm, a Support Vector Machine Algorithm, an Apriori Algorithm, Linear Regression, Logistic Regression, an Artificial Neural Network, Random Forests, Decision Trees, and/or Nearest Neighbours.

The program code applies the connection map 554 to the ROI classifications 546 to correct ROI classifications 546 for cells classified as astrocytes and neurons (based on the connection map 554) and generates a classification result 555 (557). Based on the classification result 555, the program code determines metrics 565 for each identified cell type in the ROIs (560). These metrics can include, but are not limited to, a number of cells of each cell type, positional localization of each cell type, and/or for each cell type: cell color, cell shape (e.g., size, roundness, etc.), and/or nuclear shape (e.g., size, roundness, etc.). In some examples herein, the program code can modify the initial image or images 501 provided to the program code, including marking the identified cell types and nuclear aspects of the images 501.

When training the various classification algorithms or AI processes, including but not limited to, the nuclei detector 315, 515, the cell classifier 325, 525, and/or the axon-dendrite detector 556, checking the classification results 355, 555 against cell culture information. Additionally, comparing classification results 355, 555 against cell culture information can serve as an additional check on the classification results 355, 555. For example, if the results are inconsistent with the culture information, the program code can recognize certain inconsistencies and further tune the classification results 355, 555. Thus, in some examples, the program code checks to see if the results are consistent with the culture information that shows a number of cells seeded in a target well. For example, if the program code classifies certain entities within the image as astrocytes but no astrocytes were seeded, the program code can change the classification results to neurons. FIG. 6 is an illustration 600 of a process that includes this additional check for the results. However, in some examples, this check is implemented by the program code without the program first evaluating ROI classifications 546 with a connection map 554 generated using an axon-dendrite detector 556.

Referring to FIG. 6, in this illustration 600, which also includes a workflow, program code executing on one or more processors obtains image data 601 (e.g., fluorescent images of cell cultures, including bi-cultures and/or tricultures) (610). The image data can include multiple staining with stains corresponding to nuclear 602 and each cell type: neurons 604, astrocytes 603, and microglia 605. The program code applies a nuclei detection AI 615 (e.g., one or more trained machine learning algorithm which can be applied via a neural network) to detect nuclei in the one or more images 601, which includes the nuclear channel 602 (520). Based on detecting nuclei in the one or more images 601, the program code generates a nuclear segmentation map (e.g., nuclear map (n')) 635 (630). The program code utilizes the nuclear segmentation map to identify one or more ROIs 645 in each of the one or more images (640). The ROIs 645 include the segmented nuclear channel 602, astrocytes 603, microglia 604, and neurons 605. The program code determines the cell type of each ROI by applying a cell classifier AI 625 to produce ROI classifications 646 (550).

Concurrently and/or asynchronously to detecting the nuclei (620) and classifying the cells in each ROI (650), the program code detects dendrites and/or axons in cell type channels of the one or more images 601 (neuron 604, astrocyte 603, and/or microglia 605) and generates a segmentation or connection map 654 (651). To generate the connection map 654, the program code applies an axon and dendrite detector 656 (e.g., an AI or machine-learning process), to the neuron 604, astrocyte 603, and/or microglia 605 channels. The segmentation or connection map 654 includes a segmented representation of axons or dendrites, cell bodies, and/or background.

The program code applies the connection map 654 to the ROI classifications 646 to correct ROI classifications 646 for cells classified as astrocytes and neurons (657). In this example, concurrently and/or asynchronously with various aspects, the program code obtains culture information 671 for the culture that is the subject of the one or more images (658). The culture information includes data regarding the number and types of cells seeded in a target well. The program code performs a consistency check to determine whether there are inconsistencies between the most recent results (e.g., the ROI classification if the example does not include an axon-dendrite detector 656, and the results after the correction 657 if it does) (659). The program code modifies the most recent results to correct any inconsistencies to generate a classification result 655 (657). For example, if the culture information does not include astrocytes but the results identify astrocytes, the program code changes the astrocytes to neurons. Based on the classification result 655, the program code determines metrics 665 for each identified cell type in the ROIs (660). These metrics can include, but are not limited to, a number of cells of each cell type, positional localization of each cell type, and/or for each cell type: cell color, cell shape (e.g., size, roundness, etc.), and/or nuclear shape (e.g., size, roundness, etc.). In some examples herein, the program code can modify the initial image or images 601 provided to the program code, including marking the identified cell types and nuclear aspects of the images 601.

FIG. 7 provides an illustration 700 of various aspects of the workflow 100 of FIG. 1 as applied to a cardiac cell culture. FIG. 7 provides a more graphical view of various aspects also described in FIG. 1 with a focus on the application of various aspects to a cardiac culture. Like FIG. 3, FIG. 7 is provided for illustrative purposes and for ease of understanding, aspects of the workflow 100 of FIG. 1 integrated into FIG. 7 are labeled similarly as in FIG. 1. However, FIG. 7 may include different aspects and examples than FIG. 1 and these differences do not introduce any limitations and merely illustrate different examples of those various aspects across various implementations. As illustrated in FIG. 7, program code executing on one or more processors obtains image data 701 (710). The image data 701 can be cell cultures, including but not limited to, fluorescent images of cell cultures, including cultures, bi-cultures and/or tricultures, biopsy, blood specimens etc. In this example, the image data includes cardiac cells and the image can include multiple staining with stains corresponding to nuclear 702 and each cell type: cardiomyocytes 703 and cardiac fibroblasts 704. The program code applies a nuclei detection AI 715 (e.g., one or more trained machine learning algorithm which can be applied via a neural network) to detect nuclei in the one or more images 701, which includes the nuclear channel 702 (720). Based on detecting nuclei in the one or more images 701, the program code generates a nuclear segmentation map (e.g., nuclear map (n')) 735 (730). The program code utilizes the nuclear segmentation map to identify one or more ROIs 745 in each of the one or more images (740). The ROIs 745 include the segmented nuclear channel 702, cardiomyocytes 703 and cardiac fibroblasts 704. The program code generates a classification result by automatically determining, by the one or more processors, statistical information of the cells (750). In some examples, by determining this statistical information, the program code determines a cell type for each cell in each region of interest. In some examples, the program code, utilizing the statistical information, identifies a dominant cell type in the cells. In some examples, the program code determines the cell type of each ROI by applying a cell classifier AI 725, producing a classification result 755 (750). Based on the classification result, the program code determines metrics 765 for each identified cell type in the ROIs (760). These metrics can include, but are not limited to, a number of cells of each cell type, positional localization of each cell type, and/or for each cell type: cell color, cell shape (e.g., size, roundness, etc.), and/or nuclear shape (e.g., size, roundness, etc.). In some examples herein, the program code can modify the initial image or images 701 provided to the program code, including marking the identified cell types and nuclear aspects of the images 701. Thus, the program code identifies cardiomyocytes 703 and cardiac fibroblasts 704 in the image data 701.

Just as in the example with neuronal cells, in some examples where aspects herein are applied to cardiac cells, certain corrections and consistency checks can be implemented. A consistency check can be trained utilizing known entities. For example, a culture where the number of cardiomyocytes 703 and cardiac fibroblasts 704 in the image data 701 is known can be analyzed using the process illustrated in FIG. 7. The results of this analysis can then be compared with the known values. The program code can modify the most recent results to correct any inconsistencies to generate an updated classification result 755. For example, if the culture information does not include cardiomyocytes but the results identify cardiomyocytes, the program code can tune the algorithms to correct the incorrect identification logic.

FIG. 8 provides an illustration 800 of various aspects of the workflow 100 of FIG. 1 as applied to an image of a cell culture. FIG. 8 is provided as a generic example to illustrate how aspects of some embodiments of the present invention can be applied to provide statistical information for different types of cell cultures, including but not limited to, identifying cells and cell characteristics in an image and/or determining metrics for each of the cells in an ROI identified by the program code. As illustrated in FIG. 8, program code executing on one or more processors obtains image data 801 (810). The image data 801 can be cell cultures, including but not limited to, fluorescent images of cell cultures, including cultures, bi-cultures and/or tricultures, biopsy, blood specimens etc. Because this example is for an image of a generic culture, the cells could be any type of cell including, but not limited to neuronal cells, cardiac cells, stem cells (e.g., mesenchymal stem cells), epithelial cells, nerve cells, muscle cells, connective tissue cells, immune system cells, etc. The image data 801 includes nuclear 802 elements and one or more different type of cell. For example, if the image data 801 were of a blood sample, it could include different types of white blood cells, including but not limited to, lymphocytes (e.g., T-cells, B-cells and natural killer (NK) cells), neutrophils, and/or monocytes/macrophages. In another example, the image data 801 could include different types of cells such as granulocytes (e.g., neutrophils, eosinophils, and/or basophils), agranulocytes (e.g., lymphocytes and/or monocytes), and/or anucleated red blood cells, etc. For inclusivity and illustrative purposes, the image data 801 in this example include nuclear 802 and two cell types: cell type 1 803 and cell type 2 804. The use of these two cell types was selected at random and program code in embodiments of the present invention can be trained in the examples herein to differentiate multiple types of cells.

The program code applies a nuclei detection AI 815 (e.g., one or more trained machine learning algorithm which can be applied via a neural network) to detect nuclei in the one or more images 801, which includes the nuclear channel 802 (820). Based on detecting nuclei in the one or more images 801, the program code generates a nuclear segmentation map (e.g., nuclear map (n')) 835 (830). The program code utilizes the nuclear segmentation map to identify one or more ROIs 845 in each of the one or more images (840). The ROIs 845 include the segmented nuclear channel 802, cell type 1 803 and cell type 2 804. The program code generates a classification result by automatically determining, by the one or more processors, statistical information of the cells (850).

In some examples, by determining this statistical information, the program code determines a cell type for each cell in each region of interest. In some examples, the program code, utilizing the statistical information, identifies a dominant cell type in the cells. In some examples, the program code determines the cell type of each ROI by applying a cell classifier AI 825, producing a classification result 855 (850). Based on the classification result, the program code determines metrics 865 for each identified cell type in the ROIs (860). These metrics can include, but are not limited to, a number of cells of each cell type, positional localization of each cell type, and/or for each cell type: cell color, cell shape (e.g., size, roundness, etc.), and/or nuclear shape (e.g., size, roundness, etc.). In some examples herein, the program code can modify the initial image or images 801 provided to the program code, including marking the identified cell types and nuclear aspects of the images 801. Thus, the program code identifies cell type 1 803 and cell type 2 804 cells in the image data 801. As discussed in relation to neuronal cells and cardiac cells, in some embodiments of the present invention, the program code can perform a consistency check and the results of the consistency check can automatically tune the AI algorithms performing the classifications.

Figure 9:
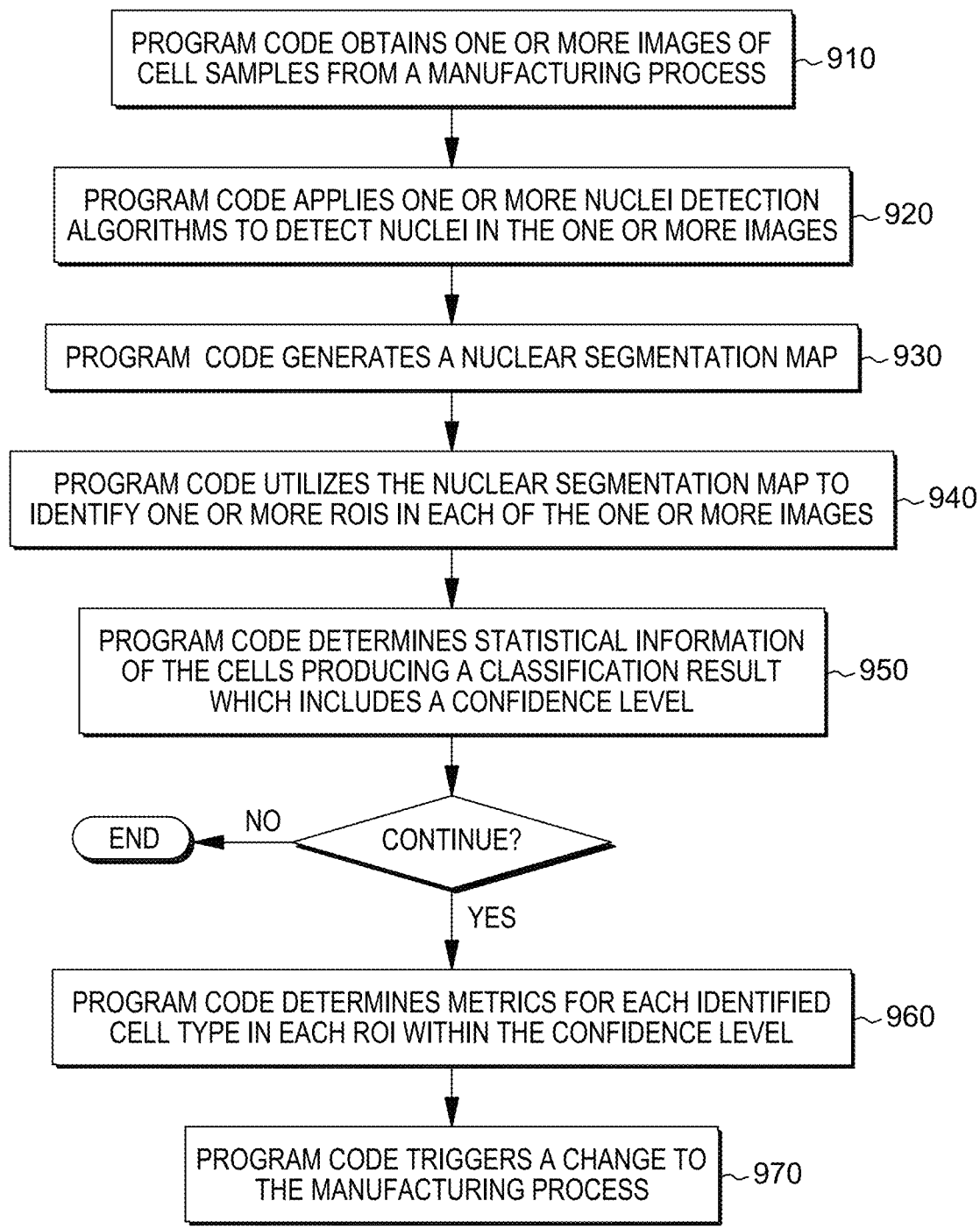
FIG. 9 depicts an example of a workflow for utilizing artificial intelligence aspects of the examples herein to aid in scaling of a biomanufacturing process.

FIG. 9 is a workflow 900 that illustrates how certain aspects of some examples herein can be utilized in manufacturing procedures, including but not limited to scale-up and scale-out procedures. Aspects of embodiments of the present invention are applicable to manufacturing processes because the program code can provide identification information for cells within an image of a co-culture within a quantifiable confidence level, based on the training of the machine learning algorithms. From the measured and predicted values, a confidence interval can be constructed. In some example, the confidence level is ~95%. Thus, cells within the co-culture that cannot be identified within this confidence level can be considered as being "out of specification" in a biomanufacturing environment and would be recommended for further testing. In the examples herein, the machine learning enables the program code to discover important cell image features and to discover them quickly, providing yes/no feedback in real-time or close to real-time. For cell manufacturing purposes, being able to identify cell structures with a ~95% confidence level (for example) to ensure that future batches/clones from donors fall within this range, in real-time or near real-time is a priority over providing detailed information about cell features as well as how these features relate to the underlying biology. The quick recognitions (or lack thereof if something is out of specification) by the program code of items outside of a specification is therefore applicable in manufacturing environments.

As discussed earlier, in examples herein, the program code differentiates the cell types of the cells in the images by applying one or more artificial intelligence (AI) instruction sets, which can also be understood as trained classification algorithms. In this example, the image is from a cell sample created in a manufacturing process. Thus, in differentiating the call type, the program code can determine whether it can recognize the cell types within a pre-determined confidence level (e.g., 95%). If the program code cannot identify the cells within this confidence level, the program code can alert the user of the discrepancy immediately.

Referring to FIG. 9, the program code obtains one or more images (910). In some examples, the one or more images comprise images of cells in sample of blood and/or tissue, including but not limited to, cultures, such as co-cultures and tri-cultures. In some examples, the program code identifies and provides metrics for cells in images of cultures where there is more than one cell type present. Thus, in embodiments of the present invention, the program code differentiates cell types. As aforementioned, the program code can also determine if it cannot differentiate cell types within a pre-determined confidence level.

The program code applies one or more nuclei detection algorithms to detect nuclei in the one or more images (920). In some examples, the nuclei detection can comprise classifiers, including image classifiers, such as Artificial Neural Networks (ANN), the aforementioned CNNs (including, but not limited to Mask-RCNNs), Autoencoder Neural Networks (AE), Deep Convolutional Networks (DCN), and/or other image classifiers and/or segmentation models that are known by a person of ordinary skill in the art, and combinations thereof. In examples that utilize a CNN, the program code can configure the CNN utilizing an artificial intelligence (AI) instruction set (e.g., native AI instruction set or appropriate AI instruction set). In certain examples herein, the classifiers utilized are deep learning models. The nodes and connections of a deep learning model can be trained and retrained without redesigning their number, arrangement, interface with image inputs, etc. In some examples, these node collectively form a neural network. However, in certain embodiments, the nodes of the classier do not have a layered structured. To configure the neural network, the program code can connect layers of the network, define skip connections for the network layers, set coefficients (e.g., convolutional coefficients) to trained values, set a filter length, and determine a patch size (e.g., a n×n pixel area of the image, where n can be 3, 4, etc.). In some examples, the program code utilizes a neural network to detect the nuclei in the one or more images, in real-time. In some examples, program code comprising a nuclei detector is a pre-trained CNN configured to classify aspects of the images obtained by the program code. In some examples, the CNN can be MobileNet or MobileNet2 and available in libraries such as without limiting Keras, TensorFlow, and other libraries known by a person of ordinary skill in the art. The nuclei detector can be generated, by the program code in embodiments of the present invention, can be generated from a pre-trained CNN deleting, modifying, or replacing at least a layer of neurons (e.g., input layer, output layer).

Based on detecting nuclei in the one or more images, the program code generates a nuclear segmentation map (e.g., nuclear map (n'), where n' is the nuclear channel, as originally received within the image data) (930). In some embodiments of the present invention, the program code performs nuclear detection in the image by providing the image to a deep CNN, which applies a classification model to the image to classify the image to generate the nuclear segmentation map. The program code can supply or feed the one or more images into either a pre-trained or a vanilla 3D-CNN. In some examples, the program code combines image processing features with a data-driven deep learning model, to produce the segmentation map. In some embodiments of the present invention, the program code provides each of the one or more images, which include nuclear channels, to a nuclei detection AI. The AI generates a nuclear segmentation map as its output.

The program code utilizes the nuclear segmentation map to identify one or more ROIs in each of the one or more images (940). The program code determines statistical information of the cells, producing a classification result (950). In this examples, the classification results include with what confidence level the cells can be classified. In some examples, the program code can determine the cell type of each ROI. In some examples, the program code determines the cell type of each ROI by applying a cell classifier. The program code of the cell classifier obtains the ROIs (as input) and outputs the cell type of each ROI. The cell classifier can be implemented utilizing a similar approach to the nuclei detector. For example, the cell classifier can comprise an AI instruction set. The cell classifier can also utilize a neural network, including but not limited to those neural networks discussed in connection with FIG. 1. The classifier can comprise machine learning algorithms including those discussed in connection with FIG. 1. As discussed in reference to FIG. 1, in some examples, the program code tunes the classifier to increase its accuracy. As discussed above, the program code can determine the efficacy of the cell classifier. For example, if the cell classification cannot be accomplished within a pre-determined confidence level, the program code can alert a user. As the results are being utilized for cell manufacturing purposes, being able to identify cell structures with a given confidence level would ensure that future batches/clones from donors fall within an acceptable specification. And absent this assurance, the cells of the culture cannot pass this test for future use.

Based on the confidence level being outside of the specified level (thus, the cells being outside of the specification), the program code alerts a user to the discrepancy and in some examples, provides an option to terminate the analysis (955). Depending on a configuration, the program code can perform additional biological analysis on cells after the program code provides a lower-than-desired confidence level, or the program code can terminate the analysis. However, should the confidence level be acceptable and should the configuration or and/or a user input indicate that the analysis should continue, based on the classification result, the program code determines metrics for each identified cell type in the ROIs (960). These metrics can include, but are not limited to, a number of cells of each cell type, positional localization of each cell type, and/or for each cell type: cell color, cell shape (e.g., size, roundness, etc.), statistical features among identified cells, and/or nuclear shape (e.g., size, roundness, etc.), cell boundaries, and/or a plurality of texture metrics. The texture metrics can include a plurality of subcellular features. In some examples, the program code determines which type of cell is dominant in a given culture.

The results of this example can be utilized for aiding in scaling biomanufacturing processes (e.g., cell therapies translate from the laboratory to the clinic). Thus, based on a confidence level (or possibly an override by the user if the confidence level was not met), the program code can trigger at least one change in a manufacturing process that generated the cell culture from which the image was generated (970). For example, if the confidence level is outside of the specification, an improvement should be made to the process before it can be scaled up. If the confidence level is within the acceptable range, the process can be scaled. In some examples, this example can be utilized as a sanity check on cells generated in a manufacturing process to determine whether the cells generated meet desired specifications or whether the process should be adjusted to make changes including, but not limited to, progressively increasing a surface area/culture volume as the cell number raises and/or to create multiple culture vessels/bioreactors that can be utilized in parallel.

Figure 10:
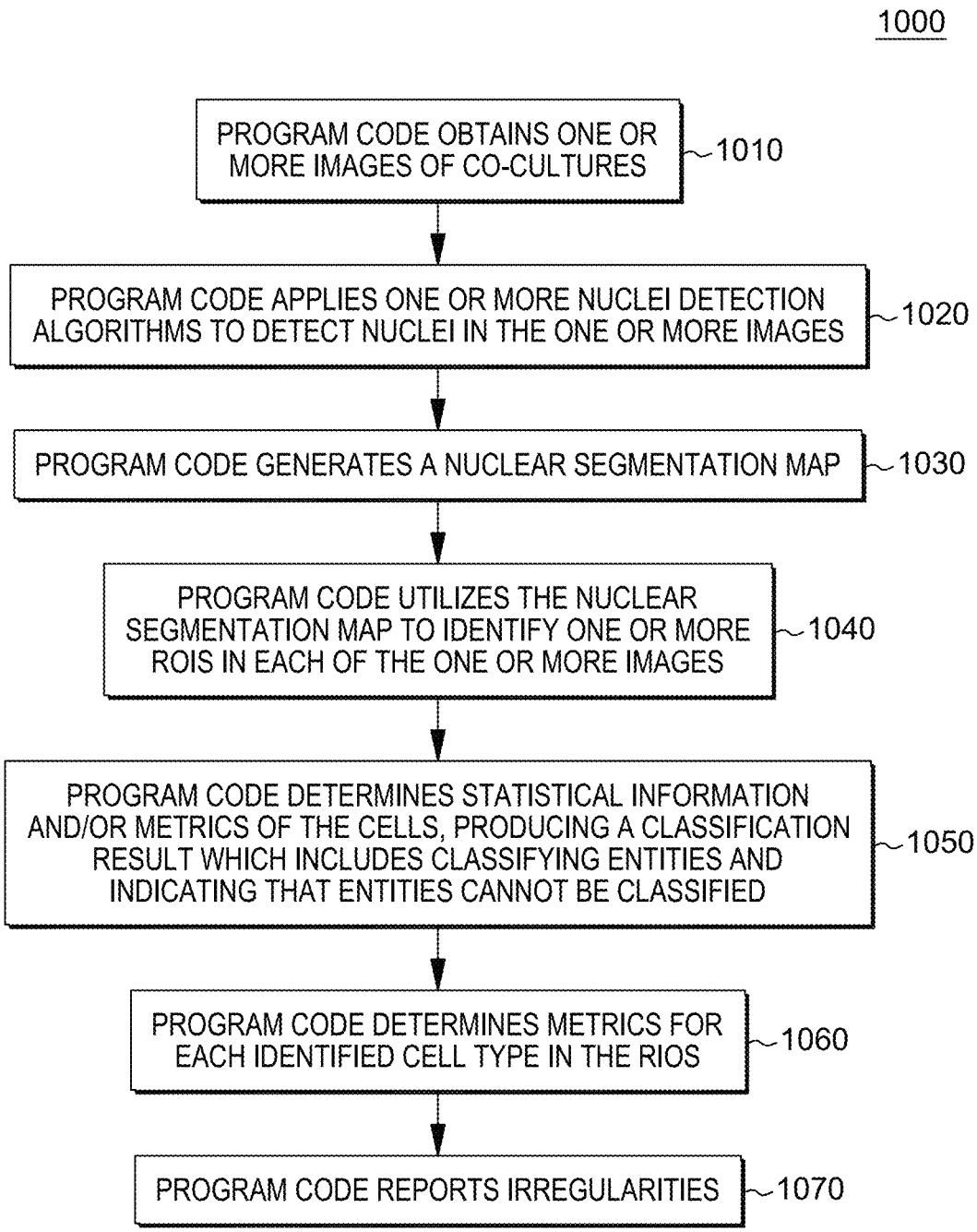
FIG. 10 depicts an example of a workflow for utilizing artificial intelligence aspects of the some of the examples herein for pathology and diagnostic assistance.

Just as examples described herein can be utilized to tune biomanufacturing processes, the ability of the program code to identify not only different cell types but also to identify unexpected or abnormal entities within images of co-cultures can also be utilized in therapeutic, pharmaceutical, and other medical treatment settings, providing, for example, pathology and/or diagnostics. In the manufacturing examples, the program code identifies when a confidence level for classifications places a result outside of the specification. But in some examples relevant to medical treatment settings, the program code utilizes trained machine learning algorithms to identify outliers within cell samples (e.g., co-cultures, etc.). By identifying outliers, the program code assists professional medical staff in the diagnosis of medical conditions. The program code identifies abnormalities and a trained professional can utilize the abnormality identifications to make diagnoses. FIG. 10 is a workflow 1000 that depicts an example of aspects disclosed herein when utilized to identify abnormalities in cells that can be utilized. As discussed above, program code in various embodiments of the present invention differentiates cells by learning qualities of the different types if cells based on images of these different cell types. Thus, the program code can identify cells that do not fit the expected pattern. This workflow 1000 differs from other workflows described herein because it is the cells that cannot be classified by the program code that provide a result to a user as these cells cannot be classified because they include unexpected irregularities and therefore can indicate disease and/or other abnormalities. These irregularities can be reviewed by medical staff for diagnostic purposes. Thus, this example demonstrates how aspects described herein can be utilized to provide pathology and diagnostics.

Referring to FIG. 10, this workflow 10000 illustrates how the program code identifies irregularities and can be trained to create alerts and/or other messaging when irregularities exceed pre-defined thresholds. Referring to FIG. 10, the program code obtains one or more images of co-cultures (i.e., cultures with more than one cell type) (1010). In some examples, the one or more images comprise images of cells in sample of blood and/or tissue. As is the case in other applications of the aspects herein, in embodiments of the present invention, the program code types of cells included in the co-cultures can be varied, including but not limited to, neuronal cells, cardiac cells, embryonic stem cells (ESC), induced pluripotent stem cells (iPSC), neural stem cells (NSC), retinal pigment epithelial stem cells (RPESC), mesenchymal stem cells (MSC), hematopoietic stem cells (HSC), and/or cancer stem cells (CSC). As aforementioned, these metrics can include, but are not limited to, a number of cells of each cell type, positional localization of each cell type, and/or for each cell type: cell color, cell shape (e.g., size, roundness, etc.), statistical features among identified cells, and/or nuclear shape (e.g., size, roundness, etc.), cell boundaries, and/or a plurality of texture metrics. The texture metrics can include a plurality of subcellular features. Thus, in this example, once the artificial intelligence (including machine learning algorithms) is trained to identify cell types and provide cell descriptions and/or metrics, this AI can then determine when entities in a sample are unexpected and the program code cannot classify these entities. As discussed earlier, in some examples herein, the program code differentiates the cell types of the cells in the images by applying one or more artificial intelligence (AI) instruction sets, which can also be understood as trained classification algorithms. But in this example, the program code also alerts a user when entities are identified that fall outside of an expected/trained/learned set of classification parameters as irregularities in cells can be indicative of disease, etc.

Upon obtaining the sample (1010), the program code applies one or more nuclei detection algorithms to detect nuclei in the one or more images (1020). As with other examples discussed, the nuclei detection can comprise classifiers, including image classifiers, such as Artificial Neural Networks (ANN), the aforementioned CNNs (including, but not limited to Mask-RCNNs), Autoencoder Neural Networks (AE), Deep Convolutional Networks (DCN), and/or other image classifiers and/or segmentation models that are known by a person of ordinary skill in the art, and combinations thereof. In examples that utilize a CNN, the program code can configure the CNN utilizing an artificial intelligence (AI) instruction set (e.g., native AI instruction set or appropriate AI instruction set). In certain examples herein, the classifiers utilized are deep learning models. The nodes and connections of a deep learning model can be trained and retrained without redesigning their number, arrangement, interface with image inputs, etc. In some examples, these node collectively form a neural network. However, in certain embodiments, the nodes of the classier do not have a layered structured. To configure the neural network, the program code can connect layers of the network, define skip connections for the network layers, set coefficients (e.g., convolutional coefficients) to trained values, set a filter length, and determine a patch size (e.g., a n×n pixel area of the image, where n can be 3, 4, etc.). In some examples, the program code utilizes a neural network to detect the nuclei in the one or more images, in real-time. In some examples, program code comprising a nuclei detector is a pre-trained CNN configured to classify aspects of the images obtained by the program code. In some examples, the CNN can be MobileNet or MobileNet2 and available in libraries such as without limiting Keras, TensorFlow, and other libraries known by a person of ordinary skill in the art. The nuclei detector can be generated, by the program code in embodiments of the present invention, can be generated from a pre-trained CNN deleting, modifying, or replacing at least a layer of neurons (e.g., input layer, output layer).

Based on detecting nuclei in the one or more images, the program code generates a nuclear segmentation map (e.g., nuclear map (n'), where n' is the nuclear channel, as originally received within the image data) (1030). In some embodiments of the present invention, the program code performs nuclear detection in the image by providing the image to a deep CNN, which applies a classification model to the image to classify the image to generate the nuclear segmentation map. The program code can supply or feed the one or more images into either a pre-trained or a vanilla 3D-CNN. In some examples, the program code combines image processing features with a data-driven deep learning model, to produce the segmentation map. In some embodiments of the present invention, the program code provides each of the one or more images, which include nuclear channels, to a nuclei detection AI. The AI generates a nuclear segmentation map as its output.

The program code utilizes the nuclear segmentation map to identify one or more ROIs in each of the one or more images (1040). The program code determines statistical information and/or metrics of the cells, producing a classification result which includes classifying entities and indicating that entities cannot be classified (1050). In some examples where certain entities cannot be classified by the program code, the program code alerts a user to these entities. In some examples, the program code can mark up the image is order to highlight locations of the entities that cannot be classified by the program code.

In cases where the program code can classify cells, the program code can determine the cell type of each ROI. In some examples, the program code determines the cell type of each ROI by applying a cell classifier. The program code of the cell classifier obtains the ROIs (as input) and outputs the cell type of each ROI. The cell classifier can be implemented utilizing a similar approach to the nuclei detector. For example, the cell classifier can comprise an AI instruction set. The cell classifier can also utilize a neural network, including but not limited to those neural networks discussed in connection with FIG. 1. The classifier can comprise machine learning algorithms including those discussed in connection with FIG. 1. As discussed in reference to FIG. 1, in some examples, the program code tunes the classifier to increase its accuracy.

Based on the classification result, the program code determines metrics for each identified cell type in the ROIs (1060). These metrics can include, but are not limited to, a number of cells of each cell type, positional localization of each cell type, and/or for each cell type: cell color, cell shape (e.g., size, roundness, etc.), statistical features among identified cells, and/or nuclear shape (e.g., size, roundness, etc.), cell boundaries, and/or a plurality of texture metrics. The texture metrics can include a plurality of subcellular features. As aforementioned, the program code cam also indicate that certain entities cannot be classified and/or that the entities that are classified cannot be classified to a threshold confidence level. In this manner, the program code identifies irregularities in the cells of the co-culture. Additionally, the program code can identify whether the statistics of the co-culture, given the history of other analyses, is within an expected result. For example, the expected result could be x % cell A and y % cell B. If this ratio is not found in the culture analyzed, the program code can identify this unexpected ratio as an anomaly.

In some examples, the program code determines which type of cell is dominant in a given culture. In some example, the program code can indicate that a dominant entity in the co-culture cannot be classified. The machine learning algorithms are trained to classify entities in a co-culture using, in one example, images of co-cultures where the cells are within a range of expected metrics. Thus, the program code can identify a cell and/or cells that differ from an expected appearance and/or range of appearances. As understood by medical professionals, understanding the pathology and/or diagnosing potential conditions can be accomplished by identifying abnormalities in cell structures. Abnormalities in cells themselves, causing the classifier described herein to be unable to classify them and/or to only be able to classify them within a low level of confidence, can be indicative of medical issues, including but not limited to, cancer. Additionally, given that examples herein provide statistical information regarding the types of cells in a co-culture, certain ratios of cell types in a given sample can also be indicative of an issue. Thus, the results produced by the analysis performed by the program code can not only provide diagnostic and pathology information based on identifying abnormalities in the cells themselves in a co-culture, but it can also provide diagnostic and pathology information related to the characteristics and ratios of the cells that the program code can identify utilizing the artificial intelligence. Thus, in some examples, the program code reports irregularities (1070). Notifications for these irregularities can include alerts in a graphical user interface, electronic messaging, automatically marking up the image, etc.

Embodiments of the present invention include a computer-implemented method, a computer program product, and a computer system that perform a method that can include program code obtaining an image, wherein the image depicts a cell culture comprising more than one cell type. The program code applies one or more nuclei detection algorithms to detect nuclear aspects in the image. Based on detecting the nuclear aspects, the program code generates a nuclear segmentation map. The program code utilizes the nuclear segmentation map to identify one or more regions of interest in the image. The program code generates a classification result by automatically determining statistical information of the cells.

In some examples, the program code automatically determining the statistical information comprises the program code automatically determining a cell type for each cell in a region of interest of the regions of interest.

In some examples, the statistical information includes an identification of a dominant cell type in the cells.

In some examples, the program code generates, based on determining the cell type for each region of the regions or interest, metrics for the cell culture in the image.

In some examples, the metrics are selected from the group consisting of: a number of cells of each cell type in the image, positional localization of each cell type in the image, cell color for each cell in the image, cell shape of each cell in the image, nuclear shape of each cell in the image, cell boundaries of each cell in the image, and texture metrics.

In some examples, the metrics comprise texture metrics and wherein the texture metrics comprise a plurality of subcellular features.

In some examples, the image comprises a stain image of a cell culture.

In some examples, the cell culture comprises cells selected from the group consisting of: neuronal cells, cardiac cells, embryonic stem cells (ESC), induced pluripotent stem cells (iPSC), neural stem cells (NSC), retinal pigment epithelial stem cells (RPESC), mesenchymal stem cells (MSC), hematopoietic stem cells (HSC), and cancer stem cells (CSC).

In some examples, the cell culture is the neuronal culture and the cells depicted in the image are selected from the group consisting of: neurons, astrocytes, and microglia.

In some examples, the cell culture is the cardiac culture and the cells depicted in the image are selected from the group consisting of: cardiomyocytes and cardiac fibroblasts.

In some examples, the program code automatically determining the cell type for each cell comprises: the program code applying one or more cell classification algorithms to identifications of the regions of interest in the image; the identifications are based on the nuclear segmentation map. The automatically determining can also include the program code determining, based on applying the one or more cell classification algorithms, the cell type for each cell.

In some examples, the cells depicted in the image comprise astrocytes and neurons, and the program code cognitively analyzes the classification result, which includes: the program code detecting connections of each cell in the image with dendrites or with axons, based on identifying connections of a cell classified as an astrocyte in the classification result to a dendrite or an axon, the program code modifying the classification result to classify the cell classified as the astrocyte as a neuron, and based on identifying no connections of a cell classified as a neuron in the classification result to a dendrite or an axon, the program code modifying the classification result to classify the cell classified as the neuron as an astrocyte.

In some examples, the program code detecting the connections of each cell in the image further comprises: the program code obtaining neuron, astrocyte, and microglia channels from the image, the program code applying one or more axon and dendrite detection algorithms to the to the channels from the image, and the program code generating, based on applying the one or more axon and dendrite detection algorithms, a connection map identifying connections of each cell to an axon or to a dendrite.

In some examples, the image comprises a stain image of a cell culture. In some of these examples, the program code obtains culture data for the cell culture. The program code compares the culture data to the classification result.

In some examples, the program code determines, based on the comparing, an inconsistency between the classification result and the culture data. The program code modifies the classification result to correct the inconsistency.

In some examples, the program code determines, based on the comparing, an inconsistency between the classification result and the culture data. The program code updates one or more algorithms applied in the automatically determining the cell type to address the inconsistency.

In some examples, the program code identifies, based on the statistical information, one or more cells of the cells for either a scale up or a scale out. The program code triggers a manufacturing process, based on the identifying.

In some examples, the image comprises an image of blood or tissue, and the statistical information of the cells comprises a pathology analysis.

In some examples, the detected connections of each cell in the image comprise a neuronal network, and the program code: continuously determines weights of each neuron in the neuronal network, and automatically updates, based on the continuously determining, the weights.

In some examples, the classification result comprises a confidence level quantifying a predicted accuracy of the classification result.

In some examples, the cell culture comprising more than one cell type was generated in a biomanufacturing process and the program code scales the biomanufacturing process based on the confidence level.

In some examples, the statistical information of the cells comprises a binary classification of entities in the cell culture as normal and abnormal.

In some examples, the program code determines that one or more entities are classified as abnormal.

In some examples, the program code alerts a user of the abnormal classifications.

In some examples, the program code determines a probability of a medical condition, based on the classification result.

Figure 11:
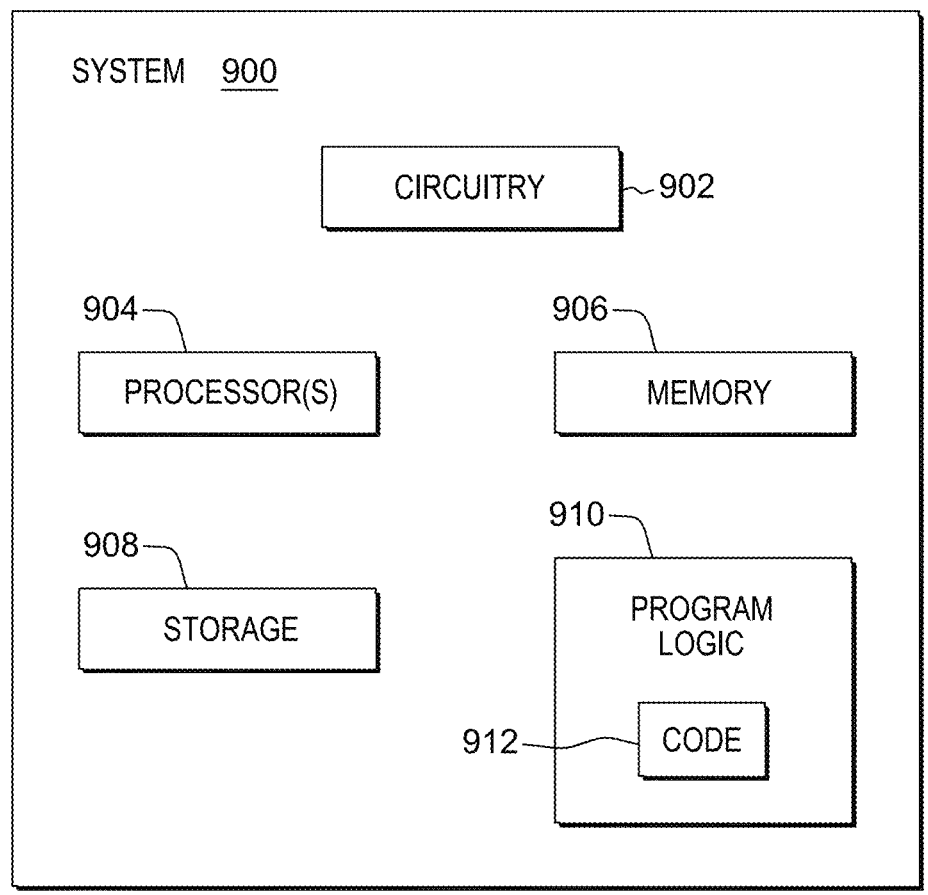
FIG. 11 depicts a computer system configured to perform an aspect of an embodiment of the present invention.

FIG. 11 illustrates a block diagram of a resource 900 in computer system, such as, which is part of the technical architecture of certain embodiments of the technique. The resource 900 can include one or more processors which implement the various classifiers discussed herein, executed the program code, and/or can also include nodes of neural networks utilized in certain examples discussed herein. The resource 900 may include a circuitry 902 that may in certain embodiments include a microprocessor 904. The computer system 900 may also include a memory 906 (e.g., a volatile memory device), and storage 908. The storage 908 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 908 may comprise an internal storage device, an attached storage device and/or a network accessible storage device. The system 900 may include a program logic 910 including code 912 that may be loaded into the memory 906 and executed by the microprocessor 904 or circuitry 902.

In certain embodiments, the program logic 910 including code 912 may be stored in the storage 908, or memory 906. In certain other embodiments, the program logic 910 may be implemented in the circuitry 902. Therefore, while FIG. 11 shows the program logic 910 separately from the other elements, the program logic 910 may be implemented in the memory 906 and/or the circuitry 902. The program logic 910 may include the program code discussed in this disclosure that facilitates the reconfiguration of elements of various computer networks, including those in various figures.

Figure 12:
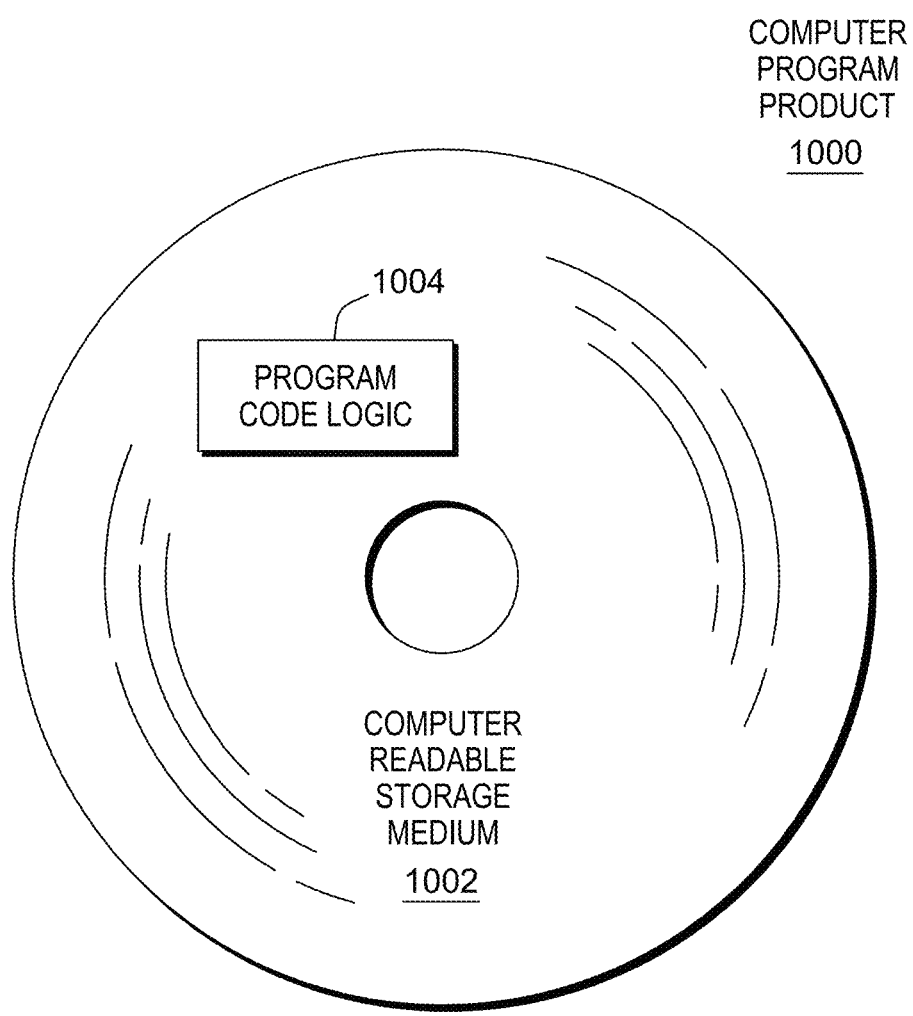
FIG. 12 depicts a computer program product incorporating one or more aspects of the present invention.

Using the processing resources of a resource 900 to execute software, computer-readable code or instructions, does not limit where this code can be stored. Referring to FIG. 12, in one example, a computer program product 1000 includes, for instance, one or more non-transitory computer readable storage media 1002 to store computer readable program code means or logic 1004 thereon to provide and facilitate one or more aspects of the technique.

As will be appreciated by one skilled in the art, aspects of the technique may be embodied as a system, method or computer program product. Accordingly, aspects of the technique may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, aspects of the technique may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable signal medium may include a propagated data signal with computer readable program code embodied therein, for example, in baseband or as part of a carrier wave. Such a propagated signal may take any of a variety of forms, including, but not limited to, electro-magnetic, optical or any suitable combination thereof. A computer readable signal medium may be any computer readable medium that is not a computer readable storage medium and that can communicate, propagate, or transport a program for use by or in connection with an instruction execution system, apparatus, or device. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

A computer readable storage medium may be, for example, but not limited to, an electronic, magnetic, optical, electromagnetic, infrared or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Any combination of one or more computer readable medium(s) may be utilized. The computer readable medium may be a computer readable signal medium or a computer readable storage medium. A computer readable signal medium may include a propagated data signal with computer readable program code embodied therein, for example, in baseband or as part of a carrier wave. Such a propagated signal may take any of a variety of forms, including, but not limited to, electro-magnetic, optical or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using an appropriate medium, including but not limited to wireless, wireline, optical fiber cable, RF, etc., or any suitable combination of the foregoing.

Computer program code for carrying out operations for aspects of the technique may be written in any combination of one or more programming languages, including an object-oriented programming language, such as Java, Smalltalk, C++ or the like, and conventional procedural programming languages, such as the "C" programming language, PHP, ASP, assembler or similar programming languages, as well as functional programming languages and languages for technical computing (e.g., Python, Matlab). The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). Furthermore, more than one computer can be used for implementing the program code, including, but not limited to, one or more resources in a cloud computing environment.

Aspects of the technique are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions, also referred to as software and/or program code, may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the technique. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In addition to the above, one or more aspects of the technique may be provided, offered, deployed, managed, serviced, etc. by a service provider who offers management of customer environments. For instance, the service provider can create, maintain, support, etc. computer code and/or a computer infrastructure that performs one or more aspects of the technique for one or more customers. In return, the service provider may receive payment from the customer under a subscription and/or fee agreement, as examples. Additionally, or alternatively, the service provider may receive payment from the sale of advertising content to one or more third parties.

In one aspect of the technique, an application may be deployed for performing one or more aspects of the technique. As one example, the deploying of an application comprises providing computer infrastructure operable to perform one or more aspects of the technique.

As a further aspect of the technique, a computing infrastructure may be deployed comprising integrating computer readable code into a computing system, in which the code in combination with the computing system is capable of performing one or more aspects of the technique.

As yet a further aspect of the technique, a process for integrating computing infrastructure comprising integrating computer readable code into a computer system may be provided. The computer system comprises a computer readable medium, in which the computer medium comprises one or more aspects of the technique. The code in combination with the computer system is capable of performing one or more aspects of the technique.

Further, other types of computing environments can benefit from one or more aspects of the technique. As an example, an environment may include an emulator (e.g., software or other emulation mechanisms), in which a particular architecture (including, for instance, instruction execution, architected functions, such as address translation, and architected registers) or a subset thereof is emulated (e.g., on a native computer system having a processor and memory). In such an environment, one or more emulation functions of the emulator can implement one or more aspects of the technique, even though a computer executing the emulator may have a different architecture than the capabilities being emulated. As one example, in emulation mode, the specific instruction or operation being emulated is decoded, and an appropriate emulation function is built to implement the individual instruction or operation.

In an emulation environment, a host computer includes, for instance, a memory to store instructions and data; an instruction fetch unit to fetch instructions from memory and to optionally, provide local buffering for the fetched instruction; an instruction decode unit to receive the fetched instructions and to determine the type of instructions that have been fetched; and an instruction execution unit to execute the instructions. Execution may include loading data into a register from memory; storing data back to memory from a register; or performing some type of arithmetic or logical operation, as determined by the decode unit. In one example, each unit is implemented in software. For instance, the operations being performed by the units are implemented as one or more subroutines within emulator software.

Further, a data processor system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processor system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or steps plus function elements in the descriptions below, if any, are intended to include any structure, material, or act for performing the function in combination with other elements as specifically noted. The description of the technique has been presented for purposes of illustration and description but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular uses contemplated.

What is claimed is:

1. A computer-implemented method comprising:
    obtaining, by one or more processors of the computing device, an image, wherein the image depicts a cell culture comprising more than one cell type;
    applying, by the one or more processors, one or more nuclei detection algorithms to detect nuclear aspects in the image;
    based on detecting the nuclear aspects, generating, by the one or more processors, a nuclear segmentation map;
    utilizing, by the one or more processors, the nuclear segmentation map to identify one or more regions of interest in the image; and
    generating a classification result by automatically determining, by the one or more processors, statistical information of the cells.

2. The computer-implemented method of claim 1, wherein automatically determining the statistical information comprises automatically determining a cell type for each cell in a region of interest of the regions of interest.

3. The computer-implemented of claim 2, further comprising:
    generating, by the one or more processors, based on determining the cell type for each region of the regions or interest, metrics for the cell culture in the image.

4. The computer-implemented method of claim 3, wherein the metrics are selected from the group consisting of: a number of cells of each cell type in the image, positional localization of each cell type in the image, cell color for each cell in the image, cell shape of each cell in the image, nuclear shape of each cell in the image, cell boundaries of each cell in the image, and texture metrics.

5. The computer-implemented method of claim 4, wherein the metrics comprise texture metrics and wherein the texture metrics comprise a plurality of subcellular features.

6. The computer-implemented method of claim 2, wherein automatically determining the cell type for each cell comprises:
    applying, by the one or more processors, one or more cell classification algorithms to identifications of the regions of interest in the image, wherein the identifications are based on the nuclear segmentation map; and
    determining, by the one or more processors, based on applying the one or more cell classification algorithms, the cell type for each cell.

7. The computer-implemented method of claim 1, wherein the statistical information includes an identification of a dominant cell type in the cells.

8. The computer-implemented method of claim 1, wherein the image comprises a stain image of a cell culture, and wherein the cell culture comprises cells selected from the group consisting of: neuronal cells, cardiac cells, embryonic stem cells (ESC), induced pluripotent stem cells (iPSC), neural stem cells (NSC), retinal pigment epithelial stem cells (RPESC), mesenchymal stem cells (MSC), hematopoietic stem cells (HSC), and cancer stem cells (CSC).

9. The computer-implemented method of claim 8, wherein the cell culture is the neuronal culture and the cells depicted in the image are selected from the group consisting of: neurons, astrocytes, and microglia.

10. The computer-implemented method of claim 9, wherein the cells depicted in the image comprise astrocytes and neurons, and wherein the method further comprises:
   cognitively analyzing, by the one or more processors, the classification result, comprising:
      detecting, by the one or more processors, connections of each cell in the image with dendrites or with axons;
      based on identifying connections of a cell classified as an astrocyte in the classification result to a dendrite or an axon, modifying the classification result to classify the cell classified as the astrocyte as a neuron; and
      based on identifying no connections of a cell classified as a neuron in the classification result to a dendrite or an axon, modifying the classification result to classify the cell classified as the neuron as an astrocyte.

11. The computer-implemented method of claim 10, wherein detecting the connections of each cell in the image further comprises:
   obtaining, by the one or more processors, neuron, astrocyte, and microglia channels from the image;
   applying, by the one or more processors, one or more axon and dendrite detection algorithms to the to the channels from the image; and
   generating, based on applying the one or more axon and dendrite detection algorithms, a connection map identifying connections of each cell to an axon or to a dendrite.

12. The computer-implemented method of claim 10, wherein the detected connections of each cell in the image comprise a neuronal network, the method further comprising:
   continuously determining, by the one or more processors, weights of each neuron in the neuronal network; and
   automatically updating, based on the continuously determining, the weights.

13. The computer-implemented method of claim 8, wherein the cell culture is the cardiac culture and the cells depicted in the image are selected from the group consisting of: cardiomyocytes and cardiac fibroblasts.

14. The computer-implemented method of claim 1, wherein the image comprises a stain image of a cell culture, the method further comprising:
   obtaining, by the one or more processors, culture data for the cell culture; and
   comparing, by the one or more processors, the culture data to the classification result.

15. The computer-implemented method of claim 14, further comprising:
   determining, by the one or more processors, based on the comparing, an inconsistency between the classification result and the culture data; and
   modifying, by the one or more processors, the classification result to correct the inconsistency.

16. The computer-implemented method of claim 14, further comprising:
   determining, by the one or more processors, based on the comparing, an inconsistency between the classification result and the culture data; and
   updating, by the one or more processors, one or more algorithms applied in the automatically determining the cell type to address the inconsistency.

17. The computer-implemented method of claim 1, further comprising:
   identifying, by the one or more processors, based on the statistical information, one or more cells of the cells for either a scale up or a scale out; and
   triggering, by the one or more processors, a manufacturing process, based on the identifying.

18. The computer-implemented method of claim 1, wherein the image comprises an image of blood or tissue, and wherein the statistical information of the cells comprises a pathology analysis.

19. The computer-implemented method of claim 1, wherein the classification result comprises a confidence level quantifying a predicted accuracy of the classification result.

20. The computer-implemented method of claim 19, wherein the cell culture comprising more than one cell type was generated in a biomanufacturing process, the method further comprising:
   scaling the biomanufacturing process based on the confidence level.

21. The computer-implemented method of claim 1, wherein the statistical information of the cells comprises a binary classification of entities in the cell culture as normal and abnormal.

22. The computer-implemented method of claim 21, further comprising:
   determining, by the one or more processors, that one or more entities are classified as abnormal.

23. The computer-implemented method of claim 22, further comprising:
   alerting, by the one or more processors, a user of the abnormal classifications; and
   based on the classification result, determining, by the one or more processors, a probability of a medical condition.

24. A computer program product comprising:
   a non-transitory computer readable storage medium readable by one or more processors of a shared computing environment and storing instructions for execution by the one or more processors for performing a method comprising:
      obtaining, by the one or more processors of the computing device, an image, wherein the image depicts a cell culture comprising more than one cell type;
      applying, by the one or more processors, one or more nuclei detection algorithms to detect nuclear aspects in the image;
      based on detecting the nuclear aspects, generating, by the one or more processors, a nuclear segmentation map;
      utilizing, by the one or more processors, the nuclear segmentation map to identify one or more regions of interest in the image; and
      generating a classification result by automatically determining, by the one or more processors, statistical information of the cells.

25. A computer system comprising:
   a memory;
   one or more processors in communication with the memory;
   program instructions executable by the one or more processors in a shared computing environment via the memory to perform a method, the method comprising:
      obtaining, by the one or more processors of the computing device, an image, wherein the image depicts a cell culture comprising more than one cell type;

applying, by the one or more processors, one or more nuclei detection algorithms to detect nuclear aspects in the image;
based on detecting the nuclear aspects, generating, by the one or more processors, a nuclear segmentation map;
utilizing, by the one or more processors, the nuclear segmentation map to identify one or more regions of interest in the image; and
generating a classification result by automatically determining, by the one or more processors, statistical information of the cells.

* * * * *